(12) United States Patent
Omohundro

(10) Patent No.: US 12,420,774 B2
(45) Date of Patent: Sep. 23, 2025

(54) VEHICLE ROLLOVER MITIGATION

(71) Applicant: Zimeno, Inc., Livermore, CA (US)

(72) Inventor: Zachary Meyer Omohundro, Livermore, CA (US)

(73) Assignee: Zimeno Inc., Livermore, CA (US)

( * ) Notice: Subject to any disclaimer, the term of this patent is extended or adjusted under 35 U.S.C. 154(b) by 186 days.

(21) Appl. No.: 18/164,577

(22) Filed: Feb. 4, 2023

(65) Prior Publication Data
US 2023/0249674 A1 Aug. 10, 2023

Related U.S. Application Data

(60) Provisional application No. 63/306,531, filed on Feb. 4, 2022.

(51) Int. Cl.
*B60W 30/04* (2006.01)
*B60W 40/02* (2006.01)
*G06V 20/56* (2022.01)

(52) U.S. Cl.
CPC .......... *B60W 30/04* (2013.01); *B60W 40/02* (2013.01); *G06V 20/56* (2022.01); *B60W 2420/403* (2013.01)

(58) Field of Classification Search
CPC ............... B60W 30/04; B60W 40/02; B60W 2420/403; G06V 20/56
USPC .......................................................... 701/41
See application file for complete search history.

(56) References Cited

U.S. PATENT DOCUMENTS

| | | | |
|---|---|---|---|
| 3,580,354 A | 5/1971 | Hewitt | |
| 3,851,780 A * | 12/1974 | Martin | E02F 3/968 180/53.3 |
| 4,148,365 A * | 4/1979 | Anderson | E02F 3/7636 172/742 |
| 4,572,301 A * | 2/1986 | Bourgeois, Jr. | E02F 3/7622 172/776 |
| 6,338,012 B2 | 1/2002 | Brown et al. | |
| 6,428,118 B1 * | 8/2002 | Blosch | B60T 8/58 303/142 |
| 6,516,260 B2 | 2/2003 | Wetzel et al. | |
| 6,799,092 B2 | 9/2004 | Lu et al. | |

(Continued)

FOREIGN PATENT DOCUMENTS

GB 2491136 A * 11/2012 ............... B60K 1/04
WO 2009076719 6/2009

OTHER PUBLICATIONS

Rockhill Farm, "Top and Tilt Install—This is a Game Changer", Oct. 30, 2021, <https://www.youtube.com/watch?v=wE6QXHZRAIM> (Year: 2021).*

(Continued)

*Primary Examiner* — Krishnan Ramesh
(74) *Attorney, Agent, or Firm* — Rathe Lindenbaum LLP

(57) ABSTRACT

A vehicle rollover mitigation system may include at least one first sensor to output rollover symptom signals indicating potential rollover of a vehicle, at least one second sensor to output vehicle environment signals indicating a surrounding environment of the vehicle and a controller to output rollover mitigation control signals for mitigating potential rollover of the vehicle based upon the rollover symptom signals and the vehicle environment signals. The vehicle rollover mitigation system may automatically respond to potential rollover by altering a state of an implement coupled to the vehicle.

14 Claims, 10 Drawing Sheets

(56) References Cited

U.S. PATENT DOCUMENTS

| | | | |
|---|---|---|---|
| 7,104,614 B2 | 9/2006 | Heuer et al. | |
| 8,275,516 B2 | 9/2012 | Murphy | |
| 2003/0163231 A1* | 8/2003 | Meyers | B60T 8/17554 |
| | | | 701/1 |
| 2006/0030991 A1* | 2/2006 | Barta | B62D 6/002 |
| | | | 701/70 |
| 2008/0059021 A1* | 3/2008 | Lu | B60G 17/0195 |
| | | | 701/36 |
| 2008/0208416 A1* | 8/2008 | Yuet | B60W 30/04 |
| | | | 340/440 |
| 2011/0022267 A1* | 1/2011 | Murphy | B60W 50/14 |
| | | | 701/124 |
| 2015/0176253 A1* | 6/2015 | Taylor | E02F 9/265 |
| | | | 701/33.9 |
| 2016/0037708 A1* | 2/2016 | Johnson | A01B 79/005 |
| | | | 701/70 |
| 2016/0068166 A1* | 3/2016 | Chen | B60W 40/06 |
| | | | 701/32.9 |
| 2016/0107641 A1* | 4/2016 | Cosentino | B60W 30/04 |
| | | | 701/41 |
| 2019/0127945 A1* | 5/2019 | Babl | E02F 3/3681 |
| 2020/0172087 A1* | 6/2020 | Shur | E02F 9/2025 |
| 2020/0189507 A1 | 6/2020 | Green | |
| 2021/0087794 A1 | 3/2021 | Yamamoto et al. | |
| 2021/0223771 A1* | 7/2021 | Whitney | B60Q 5/001 |
| 2023/0090354 A1* | 3/2023 | Hiebert | A01B 73/065 |
| | | | 172/310 |

OTHER PUBLICATIONS

PCT Search Report for PCT/US2023/012350 dated Apr. 14, 2023.
Tractors-Roll-over Prevention,https://www.ccohs.ca/oshanswers/safety_haz/tractors/rollover.html, (1997-2023) retrieved Feb. 6, 2023.
Ccohs Cchst: "Tractors—Roll-over Prevention", Oct. 3, 2017 (Oct. 3, 2017), XP093265968, Retrieved from the Internet: URL:https://web.archive.org/web/20241007230038if_/https://www.ccohs.ca/oshanswers/safety_haz/tractors/rollover.pdf [retrieved on Apr. 2, 2025] (4 pages).
Extended European Search Report (EESR) for EP 23750238.0; dated Apr. 23, 2025; 9 pages.
Zhu Qingyuan et al: "Multi-sensor based attitude prediction for agricultural vehicles", Computers and Electronics in Agriculture, vol. 156, Nov. 15, 2018 (Nov. 15, 2018), pp. 24-32, XP085571741, ISSN: 0168-1699, DOI: 10.1016/J.COMPAG.2018.11.008 (9 pages).

* cited by examiner

VEHICLE ROLLOVER MITIGATION

CROSS-REFERENCE TO RELATED PATENT APPLICATIONS

The present non-provisional patent application claims priority under 35 USC 119 from U.S. provisional Patent Application Ser. No. 63/306,531 filed on Feb. 4, 2022 by Omohundro et al. and entitled VEHICLE ROLLOVER MITIGATION, the full disclosure of which is hereby incorporated by reference.

BACKGROUND

Vehicles are sometimes subject to rollover concerns when traveling across, up or down inclines. A rollover of the vehicle may result in damage to the vehicle and injury to an operator of the vehicle.

Figure 1:
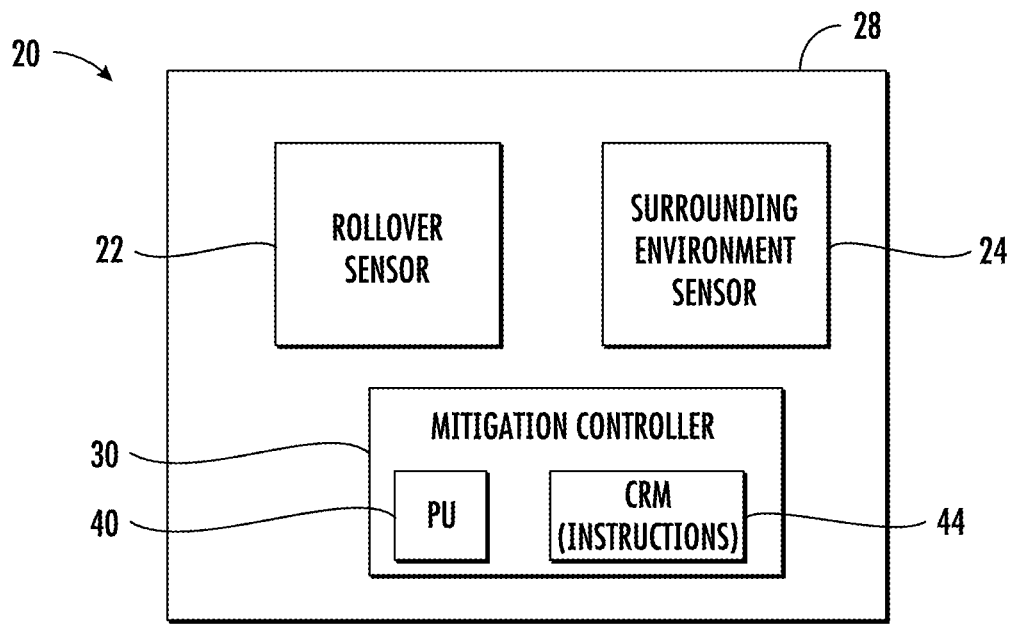
FIG. 1 is a diagram schematically illustrating portions of an example vehicle rollover mitigation system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Vehicle rollovers may have a variety of causes. For example, front and rear rollovers, pitch rollovers, may result from a load being hitched to a vehicle at too great of a height, by driving the vehicle uphill or by an implement, such as a loader bucket, being raised to too great of a height. Sideways rollovers may be caused by driving a vehicle too fast when turning on a curve, by driving too close to an incline, embankment or ditch, by applying uneven breaking while traveling at high speeds or by excessive uneven loading. The disclosed example vehicle rollover mitigation systems and methods automatically respond to rollover symptoms to shorten response time so as to better mitigate the chances of a rollover or the damage caused by an impending rollover.

The example vehicle rollover mitigation systems and methods may automatically respond to a rollover threat by altering a state of an implement coupled to the vehicle. For example, an implement may be lowered or moved away from the direction of a rollover. Altering the state of the implement may impact the center of gravity of the vehicle-implement combination to mitigate a rollover threat. In some implementations, the state of implement may be automatically altered based upon currently sensed or currently detected rollover conditions or state of the vehicle (sensed roll, pitch or yaw values of the vehicle). In some implementations, the state of the implement may be automatically altered based upon a predicted rollover threat. For example, a pre-existing topographic map may indicate regions where the slope of the terrain may present a rollover risk to a vehicle traveling over the terrain. Immediately prior to or upon reaching a region where the slope of the terrain may present a rollover risk, a controller may automatically alter a state of the implement coupled to the vehicle to mitigate or reduce any rollover risk.

As described above, some rollover threats may be predicted based upon pre-existing topography maps. In regions predicted to present a rollover risk, the vehicle itself may automatically be adjusted (slowed down or differently steered) to reduce the rollover threat. In some circumstances, the planned path for the vehicle may be adjusted to preemptively avoid those regions that are predicted, based upon the pre-existing topographic map, to present a rollover risk. Such rollover threat predictions based upon pre-existing topography maps are inherently dependent upon the current accuracy of the topographic map.

In contrast to predicting a rollover threat based on a preexisting topographical map or other map and either planning a path for the vehicle to avoid those regions on the map that present a vehicle rollover risk or automatically adjusting operation of the vehicle when the vehicle is at a location on the pre-existing map identified as imposing a rollover risk, the example vehicle rollover mitigation systems and methods may automatically respond to the beginning of an actual rollover occurrence, wherein the rollover mitigating response itself is adjusted based upon the real-time or current sensed surroundings. The response to the beginning of an actual rollover occurrence is not based solely upon the current rollover condition of the vehicle (its center of gravity, pitch, roll and/are yaw), but is additionally based upon the current surroundings of the vehicle as being currently sensed just prior to or at the time of the initiation of the rollover occurrence. For example, the current rollover state of the vehicle (based upon its center of gravity, roll, pitch and/or yaw) might prescribe a first response, that the vehicle be turned in a first direction to respond to the rollover threat.

However, such a response prescription may not take into account the actual current surroundings of the vehicle. Without taking into account the current real time surroundings of the vehicle, the first prescribed response might otherwise increase potential damage or harm. Turning the vehicle in the prescribed first direction may result in the vehicle colliding with a person, animal or temporary or unmapped inanimate structure or may result in the vehicle driving into a possibly unmapped hole or small but even steeper region, exacerbating the rollover risk.

In contrast, the example vehicle rollover mitigation systems and methods may prescribe a rollover mitigation response that is based upon the currently sensed surroundings in addition to the current rollover state of the vehicle. For example based upon the currently sensed surroundings, the example systems and methods may prescribe an alternative to the first response, a second response prescribing that the vehicle be turned in a second different direction to avoid an even steeper incline/hole or to avoid a person, animal or inanimate structure that might otherwise lie in the path of the vehicle had the first prescribed response been carried out.

Disclosed is an example vehicle rollover mitigation system. The example vehicle rollover mitigation system may include at least one first sensor to output rollover symptom signals indicating potential rollover of a vehicle, at least one second sensor to output vehicle environment signals indicating a surrounding environment of the vehicle and a controller to output rollover mitigation control signals for mitigating potential rollover of the vehicle based upon the rollover symptom signals and the vehicle environment signals. For example, steering of the vehicle to counter a potential rollover may be adjusted based upon the terrain or obstructions in front of or to a side of the vehicle.

Disclosed is an example vehicle rollover mitigation system. The example vehicle rollover mitigation system may include at least one sensor to output rollover symptom signals indicating rollover imminence of a vehicle and a controller to output rollover mitigation control signals based upon the rollover symptom signals for mitigating potential rollover of the vehicle. The rollover mitigation control signals may alter a state of an implement coupled to the vehicle. In some implementations, the rollover mitigation control signals may lower the implement towards or into greater engagement with the underlying terrain. In some implementations, the rollover mitigation control signals may alter an orientation of the implement to counter the potential rollover.

Disclosed is an example vehicle rollover mitigation method. The method may include determining a rollover potential for a vehicle coupled to an implement, sensing a parameter of an environment surrounding the vehicle, and adjusting operational parameter of the vehicle and a state of the implement based upon the determined rollover potential and the sensed parameter of the environment surrounding the vehicle.

FIG. 1 is a diagram schematically illustrating an example vehicle rollover mitigation system 20. System 20 may mitigate the chances for rollover or mitigate the resulting harm from the rollover. System 20 comprises rollover sensor 22, surrounding environment sensor 24 and mitigation controller 30. In the example illustrated, sensor 22, sensor 24 and mitigation controller 30 are each carried by vehicle 28. Vehicle 28 may be in the form of an agricultural vehicle such as a tractor or other types of a vehicle.

Rollover sensor 22 comprises at least one sensor that outputs rollover symptom signals indicating a rollover potential for a vehicle. In some implementations, rollover sensor 22 may comprise at least one inertial measurement unit (IMU) carried by the vehicle. The inertial measurement units, which may comprise a combination of accelerometers and gyros, may output rollover symptom signals indicating an orientation or attitude of the vehicle. Accelerometers may output signals indicating lateral, longitudinal and vertical acceleration measurements of the vehicle. Gyros may output symptom signals indicating a pitch rate, roll rate and yaw rate of the vehicle. Forces and moments being experienced by the vehicle can be calculated based on these measurements and vehicle geometry and mass. Such rollover symptom signals may be evaluated to determine an ongoing rollover or to predict a forthcoming rollover. For example, an ongoing or forthcoming rollover about a longitudinal axis of the vehicle, a sideways rollover, may be based upon a measured roll rate, lateral acceleration and vehicle acceleration. An ongoing or forthcoming forward or rearward rollover about a lateral axis of the vehicle, a pitch rollover, may be determined based upon a sensed pitch rate, longitudinal acceleration and vertical acceleration of the vehicle.

Surrounding environment sensor 24 comprises at least one sensor that outputs vehicle environment signals indicating a surrounding environment of the vehicle. In some implementations, surrounding environment sensor 24 comprises a vision system that comprises at least one camera carried by vehicle 28. The at least one camera may comprise a two-dimensional camera or a three-dimensional (3D) stereo camera, or a Lidar. In some implementations, sensor 24 may comprise multiple stereo, or multiple two-dimensional, cameras aimed in different directions from the vehicle. For example, such cameras may include a front facing camera, a rear facing camera and two sideways facing cameras.

Figure 2:
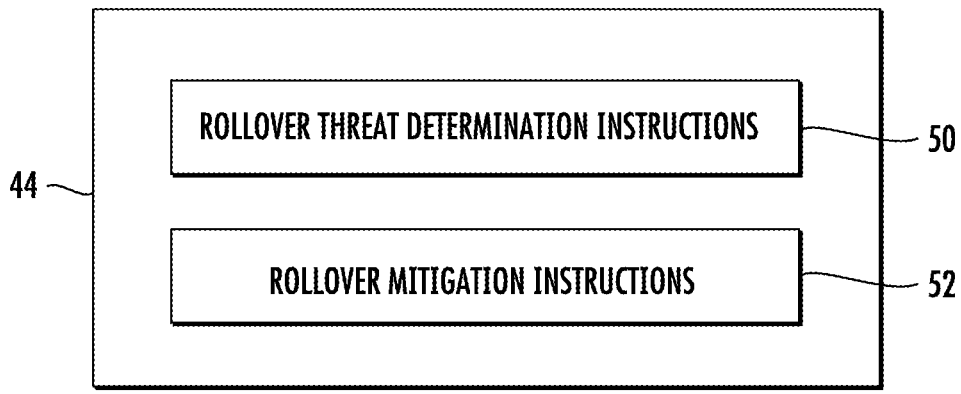
FIG. 2 is a block diagram schematically illustrating portions of an example non-transitory computer-readable medium of the system of FIG. 1.

Mitigation controller 30 comprises processing unit 40 and a computer-readable medium (CRM) 44. CRM 44 comprises a non-transitory computer-readable medium, such as a persistent storage device in the form of a flash memory, memory disk or the like, that contains instructions for directing the operation of processing unit 40. FIG. 2 is a block diagram schematically illustrating CRM 44. CRM 44 comprises rollover threat determination instructions 50 and rollover mitigation instructions 52.

Rollover threat determination instructions 50 direct processing unit 40 to analyze the rollover symptom signals from rollover sensor 22 to determine a rollover potential or threat for the vehicle. Instructions 50 may direct processing unit 40 to identify the existence of an ongoing or forthcoming rollover about a longitudinal axis of the vehicle, a sideways rollover, based upon a measured roll rate, lateral acceleration and vehicle acceleration. An ongoing or forthcoming forward or rearward rollover about a lateral axis of the vehicle, a pitch rollover, may be determined based upon a sensed pitch rate, longitudinal acceleration and vertical acceleration of the vehicle.

In some implementations, the measurements may be conditioned using a Kalman filter, such as an extended Kalman filter. The determination of the rollover threat may be based upon the current state of the vehicle, its current orientation, speed/trajectory, as well as the current planned future orientation and speed/trajectory, absent any new or unanticipated changes to the speed or steering of the vehicle. The rollover threat may be compared against a predefined safety threshold to determine whether any mitigation efforts are to be implemented by mitigation controller 30.

In some implementations, the predefined threshold may be based upon an identification or characteristics of the vehicle itself such as its size and weight distributions (center of mass/gravity). In some implementations, the predefined threshold may be additionally based upon any attachments/implements coupled to the vehicle. The predefined threshold may be based upon the height at which the implement is coupled to the vehicle, the size of the implement and the weight distribution of the implement. In some implementations, the operator of the vehicle may be prompted to input an identification of the implement, wherein such characteristics of the implement are obtained from a local memory unit or wirelessly from a remote storage unit or server. In some implementations, instructions 50 may direct processing unit 40 to utilize a camera located on the vehicle to capture an image of the implement and to identify the implement (and its various characteristics that may impact the predefined threshold).

In some implementations, instructions 50 may further direct processing unit 40 to determine a rollover threat at least partially based upon data acquired from the surrounding environment sensor 24. For example, images captured by camera, serving as a surrounding environment sensor 24, may be used to determine the current orientation of the vehicle relative to the horizon are relative to ground and the forthcoming terrain ahead of the vehicle, wherein such information be used to assess any forthcoming rollover potential.

Rollover mitigation instructions 52 comprise instructions that direct processing unit 40 to output rollover mitigation control signals for mitigating potential rollover of the vehicle. In response to mitigation controller 30 determining an impending or highly likely vehicle rollover given the current state of the vehicle as well as the current predicted or planned future trajectory and speed of the vehicle, a likelihood of a rollover that exceeds a predetermined safety threshold, instructions 52 direct processing unit 40 to generate mitigation control signals. The mitigation control signals alter the future or planned speed and/or steering of the vehicle to reduce the likelihood of a future rollover, to delay any impending rollover (allowing time for an operator to abandon the vehicle or for those in the impending path to move) or to reduce any possible future damage that would be caused by such a rollover (e.g., reducing the speed or moment of the rollover). The mitigation control signals result in different actions being taken by the vehicle. What actions are taken, the output of the mitigation control signals, may vary depending upon the current rollover symptoms as indicated from the rollover symptom signals received from rollover sensor 22. In response to a sufficiently high sideways rollover threat, instructions 52 may direct processing unit 40 to generate mitigation control signals based upon a current measured roll rate, lateral acceleration and vehicle acceleration. In response to a sufficiently high pitch rollover threat, instructions 52 may direct processing unit 42 generate mitigation control signals based upon a current sensed pitch rate, longitudinal acceleration and vertical acceleration of the vehicle.

In addition to generating mitigation control signals that are based upon the current rollover symptom signals received from rollover sensor 22, instructions 52 may direct processing unit 40 to also base such mitigation control signals on the vehicle environment signals received from surrounding environment sensor 24. Mitigation controller 30 may generate mitigation control signals such that any roller mitigation action or response avoids an even more catastrophic event such as the vehicle being steered to an even more steep terrain or such as the vehicle being steered to a path that that intersect a person, animal or other object. As described hereafter, rollover mitigation instructions 52 may direct processing unit 40 to determine or classify any change in terrain and slope and/or to determine or classify any objects (persons, animals or structures) in the general forward vicinity of the vehicle for which the path of the vehicle might intersect. Rollover mitigation instructions 52 may further direct processing unit 40 to determine the relative location of the change in terrain and/or object to the current position of the vehicle. For example, in some implementations, images from the 2D camera (or from two-dimensional images captured by a stereo camera, multiple cameras, or a Lidar) may be used to classify or identify objects captured in the multiple two-dimensional images. A stereo camera may be used to generate a point cloud which may be used to determine distances from a terrain or object to the stereo camera. Such determination may then be utilized by controller 30 in its determination of what mitigation actions are to be taken.

For example, absent such surrounding environment inputs, controller 30 might otherwise determine a first mitigation action that involves a first steering adjustment and a first speed adjustment. However, the surrounding environment evaluation by controller 30 may reveal that the first steering adjustment and the first speed adjustment would direct the path of the vehicle over a steeper incline and/or into physical contact with a person, animal and/or inanimate structure. Given this additional evaluation, controller 30 may generate mitigation control signals that result in a second different mitigation action that involves a second different steering adjustment and/or a second different speed adjustment so as to avoid or reduce the likelihood of the vehicle going over the steeper terrain (which may exacerbate the rollover) or reduce the likelihood of the vehicle hitting or running into the person, animal or inanimate structure.

In some implementations, rollover mitigation instructions 52 may direct processing unit 40 to evaluate potential outcomes for different possible steering and speed adjustments in response to an impending rollover and to select a particular steering and speed adjustment that results in the least amount of harm. In some circumstances, a scenario may present itself where a rollover may not be completely avoided or where it is impossible to avoid all objects during a correction or without any corrective action. In such circumstances, controller 30 may identify the future action which results in the lowest cost. For example, a first steering and/or speed adjustment may be chosen which results in the vehicle hitting a low value inanimate structure, wherein the first steering and/or speed adjustment is chosen over a second possible steering and/or speed adjustment which would result in the vehicle hitting a person. As part of the evaluation, controller 30 may select the steering and/or speed adjustment based upon a classification of the object, a determined value or priority of the object and/or the likelihood or chance of the object being struck by the vehicle. Instructions 52 may be configured to output mitigation control signals such that any future action taken (the chosen path or trajectory for the vehicle) is one that achieves the lowest "cost" in life and/or monetary values.

Figure 3:
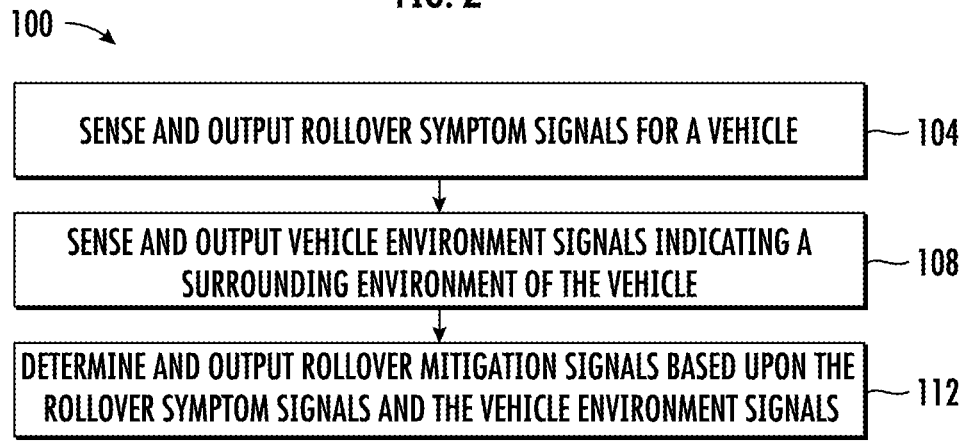
FIG. 3 is a flow diagram of an example vehicle rollover mitigation method.

FIG. 3 is a flow diagram of an example vehicle rollover mitigation method 100. Method 100 results in a vehicle automatically responding to a rollover threat based in part upon the sensed surroundings of the vehicle. Although method is described in the context of being carried out by vehicle rollover mitigation system 20, method 100 may likewise be carried out with other similar vehicle rollover mitigation systems.

As indicated by block 104, rollover sensor 22 senses and outputs rollover symptom signals for a vehicle. Such signals may indicate the current state of the vehicle as well as the current planned trajectory and speed of the vehicle. Such signals, when analyzed, may reveal a sufficiently high rollover possibility or threat that justifies a change in the planned trajectory and speed of the vehicle to mitigate the rollover threat.

As indicated by block 108, the surrounding environment sensor 24 senses and outputs vehicle environment signals indicating a surrounding environment of the vehicle. The surrounding environment may comprise terrain changes, such as changes in the slope of the terrain. The surrounding environment may additionally or alternatively comprise persons, animals or inanimate structures that might be in the path of the vehicle given possible trajectories of the vehicle.

As indicated by block 112, controller 30 may evaluate the rollover symptom signals received in block 104 to assess the chance of a rollover and compare this chance with a predetermined safety threshold. In response to the chance of a rollover exceeding a predetermined safety threshold, controller 30 may determine and output rollover mitigation signals to reduce the chance of a rollover and/or to lessen potential harm from such a rollover. The rollover mitigation signals may be based upon both the rollover symptom signals received in block 104 and the vehicle environment signals received in block 108.

Figure 4:
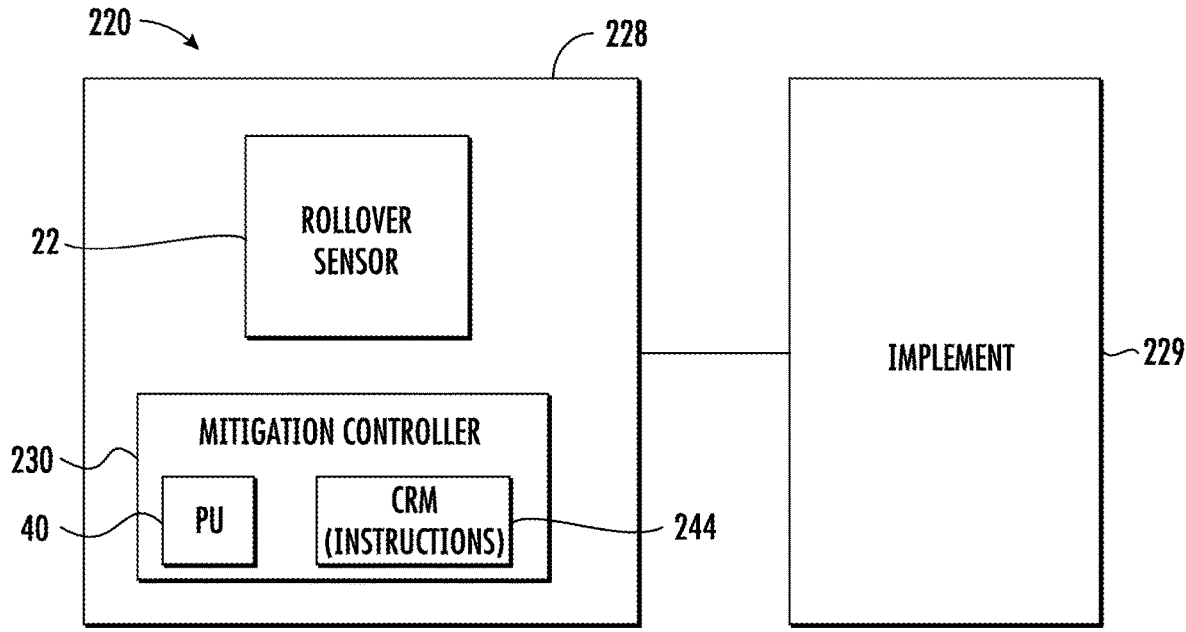
FIG. 4 is a diagram schematically illustrating portions of an example vehicle rollover mitigation system.

FIG. 4 is a diagram schematically illustrating portions of an example vehicle rollover mitigation system 220. System 20 may mitigate the chances for rollover or mitigate the resulting harm from the rollover. System 20 comprises rollover sensor 22 and mitigation controller 230. In the example illustrated, sensor 22, sensor 24 and mitigation controller 30 are each carried by a vehicle 228 which is coupled to or configured to be coupled to an implement 229. Vehicle 228 may be in the form of an agricultural vehicle such as a tractor or other types of a vehicle.

Implement 229 comprises an attachment that is carried, pushed or towed by vehicle 228. In some implementations, implement 229 may be carried by vehicle 228, at the front of vehicle 228 or at a rear of vehicle 228. For example, in some implementations, vehicle 228 may comprise a tractor or other vehicle having a three-point hitch which supports implement 229. In some implementations, implement 229 may comprise wheels, skis or the like which assist in elevating implement 229 above the underlying terrain. In some implementations, implement 229 is configured to be raised and lowered relative to the underlying terrain via hydraulics or other actuators. In some implementations, implement 229 is configured to be raised and lowered into and out of engagement with the underlying terrain. For example, implement 229 may comprise a tillage implement configured to till the underlying soil when in a lowered state. In some implementations, implement 229 is powered by power takeoff and/or hydraulics from vehicle 228. In some implementations, implement 229 may be at least partially powered by vehicle 228 and partially powered by hydraulic pumps or other actuators carried by implement 229.

Rollover sensor 22 is described above with respect to system 20. Rollover sensor 22 comprises at least one sensor that outputs rollover symptom signals indicating a rollover potential for a vehicle. In some implementations, rollover sensor 22 may comprise at least one inertial measurement unit (IMU) carried by the vehicle. The inertial measurement units, which may comprise a combination of accelerometers and gyros, may output rollover symptom signals indicating an orientation or attitude of the vehicle. Accelerometers may output signals indicating lateral, longitudinal and vertical acceleration measurements of the vehicle. Gyros may output symptom signals indicating a pitch rate, roll rate and yaw rate of the vehicle. Forces and moments being experienced by the vehicle can be calculated based on these measurements and vehicle geometry and mass.

Figure 5:
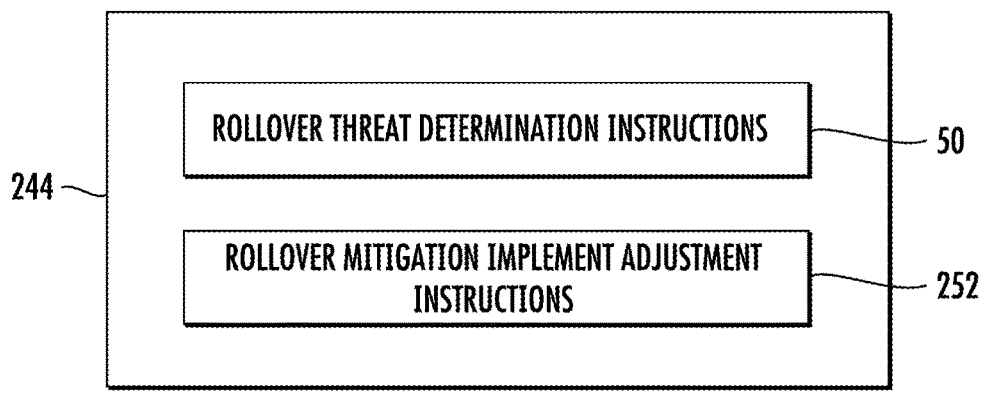
FIG. 5 is a block diagram schematically illustrating portions of an example non-transitory computer-readable medium of the system of FIG. 4.

Mitigation controller 230 comprises processing unit 40 and a computer-readable medium (CRM) 244. CRM 244 comprises a non-transitory computer-readable medium, such as a persistent storage device in the form of a flash memory, memory disk or the like, that contains instructions for directing the operation of processing unit 40. FIG. 5 is a block diagram schematically illustrating CRM 244. CRM 244 comprises rollover threat determination instructions 50 and rollover mitigation implement adjustment instructions 252.

Rollover threat determination instructions 50 are described above with respect to FIGS. 1-3. Instructions 50 direct processing unit 40 to analyze the rollover symptom signals from rollover sensor 22 to determine a rollover potential or threat for the vehicle. Instructions 50 may direct processing unit 40 to identify the existence of an ongoing or forthcoming rollover about a longitudinal axis of the vehicle, a sideways rollover, based upon a measured roll rate, lateral acceleration and vehicle resultant acceleration. In some implementations, the measurements may be conditioned using a Kalman filter such as an extended Kalman filter. The determination of the rollover threat may be based upon the current state of the vehicle, its current orientation, speed/trajectory, as well as the current planned future orientation and speed/trajectory, absent any new or unanticipated changes to the speed or steering of the vehicle. The rollover threat may be compared against a predefined safety threshold to determine whether any mitigation efforts are to be implemented by mitigation controller 230.

In some implementations, the predefined threshold may be based upon an identification or characteristics of the vehicle itself such as its size and weight distributions (center of mass). In some implementations, the predefined threshold may be additionally based upon any attachments/implements coupled to the vehicle. The predefined threshold may be based upon the height at which the implement is coupled to the vehicle, the size of the implement and the weight distribution of the implement. In some implementations, the operator of the vehicle may be prompted to input an identification of the implement, wherein such characteristics of the implement are obtained from a local memory unit or wirelessly from a remote storage unit or server. In some implementations, instructions 50 may direct processing unit 40 to utilize a camera located on the vehicle to capture an image of the implement and to identify the implement (and its various characteristics that may impact the predefined threshold).

Rollover mitigation implement adjustment instructions 252 comprise instructions that direct processing unit 40 to output rollover mitigation control signals that result in an adjustment to a state of implement 229 for mitigating potential rollover of the vehicle. In response to mitigation controller 230 determining an impending or highly likely vehicle rollover given the current state of the vehicle as well as the current predicted or planned future trajectory and speed of the vehicle, a likelihood of a rollover that exceeds a predetermined safety threshold, instructions 252 direct processing unit 40 to generate mitigation implement adjustment control signals. The mitigation control signals alter the state of implement 229 in a manner so as to reduce the likelihood of a future rollover, to delay any impending rollover (allowing time for an operator to abandon the vehicle or for those in the impending path to move) or to reduce any possible future damage that would be caused by such a rollover (e.g., reducing the speed or force of the rollover). The mitigation control signals may trigger different actions by vehicle 228 and/or the implement 229 to cause a change in the state of the implement. What adjustments made to the state of implement 229 may vary depending upon the current rollover symptoms as indicated from the rollover symptom signals received from rollover sensor 22.

In some implementations, in response to a sufficiently high sideways rollover threat, instructions 252 may direct processing unit 40 to generate rollover mitigation implement adjustment control signals based upon a current measured roll rate, lateral acceleration and vehicle resultant acceleration. In response to a sufficiently high pitch rollover threat, instructions 52 may direct processing unit 40 to generate mitigation control signals based upon a current sensed pitch rate, longitudinal acceleration and vertical acceleration of the vehicle.

In some implementations, the mitigation implement adjustment control signals may cause a height of the implement relative to the underlying terrain to be adjusted. For example, in some implementations, such signals may result in the implement being lowered towards the underlying terrain in response to a sideways rollover threat or in response to a pitch rollover threat. Such signals may result in implement 229 being lowered through the lowering of lower links of a three-point hitch. Such signals may result in implement 229 being lowered by hydraulics carried by implement 229 which pivot or translate portions of implement 229 towards the underlying terrain or ground. In some implementations, portions of implement 229 may be lowered to an extent such that such portions physically contact or engage the underlying terrain. In some implementations, portions of implement 229 may be lowered to an extent such that such portions extend below the surface of the ground or underlying terrain.

In some implementations, the rollover mitigation implement adjustment control signals may result in adjustment of the orientation of the implement. For example, such control signals may result in lower links of a three-point hitch being differentially raised and lowered to pivot or rotate the implement about longitudinal axis of the vehicle, an axis perpendicular to the rotational axis of the wheels of the vehicle. Such control signals may result in hydraulics on the implement moving the two opposite lateral sides of the implement to different heights above the underlying terrain. In addition to adjusting a state of implement 229, mitigation controller 230 may also adjust the steering and speed of vehicle 228 to mitigate the rollover threat.

Figure 6:
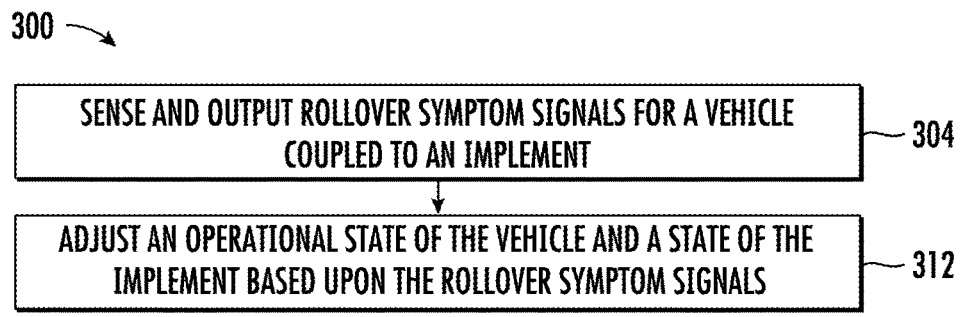
FIG. 6 is a flow diagram of an example vehicle rollover mitigation method.

FIG. 6 is a flow diagram of an example vehicle rollover mitigation method 300. Method 300 results in a vehicle automatically responding to a rollover threat based in part upon the rollover symptom signals received from rollover sensor 22. Although method 300 is described in the context of being carried out by vehicle rollover mitigation system 220, method 300 may likewise be carried out with other similar vehicle rollover mitigation systems.

As indicated by block 304, rollover sensor 22 senses and outputs rollover symptom signals for a vehicle. Such signals may indicate the current state of the vehicle as well as the current planned trajectory and speed of the vehicle. Such signals, when analyzed, may reveal a sufficiently high rollover possibility or threat that justifies a change in the planned trajectory and speed of the vehicle to mitigate the rollover threat.

As indicated by block 312, controller 230 may evaluate the rollover symptom signals received in block 104 to assess the chance of a rollover and compare this chance we predetermine safety threshold. In response to the chance of a rollover exceeding a predetermined safety threshold, controller 230 may determine and output rollover mitigation implement adjustment signals to reduce the chance of a rollover and/or to lessen potential harm from such a rollover. The rollover mitigation implement adjustment signals may be based upon both the rollover symptom signals received in block 304.

Figure 7:
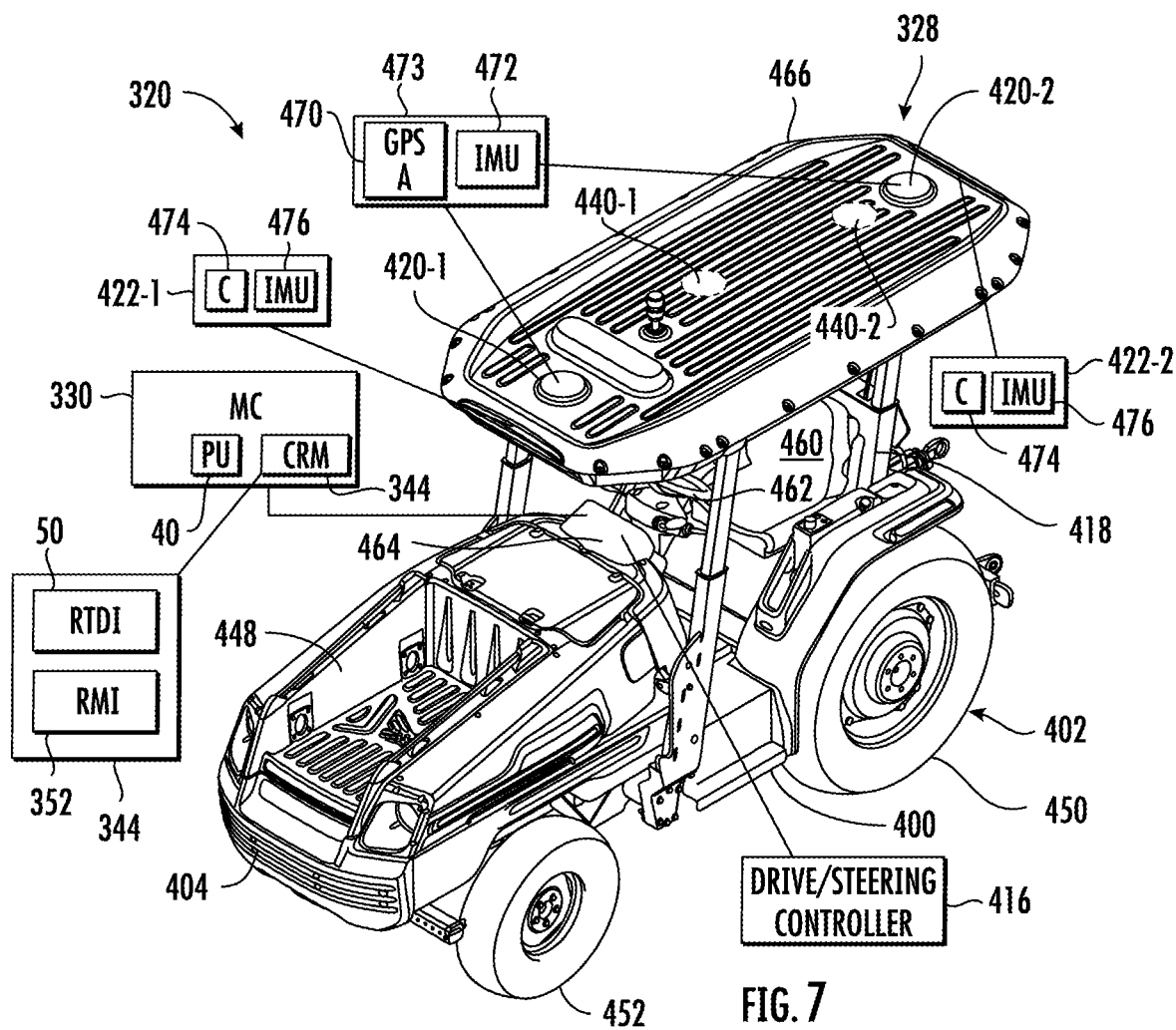
FIG. 7 is a front perspective view of an example vehicle rollover mitigation system.
Figure 8:
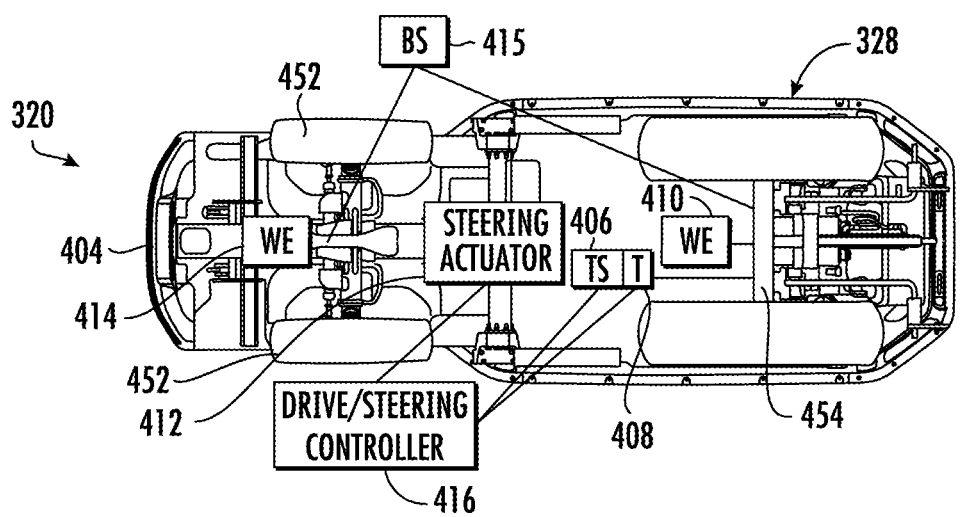
FIG. 8 is a bottom view of the example vehicle rollover mitigation system of FIG. 7.

FIGS. 7 and 8 illustrate an example vehicle rollover mitigation system 320. System 320 is similar to system 20 described above in that system 320 generates and outputs rollover mitigation control signals based upon rollover symptom signals and vehicle environment signals. System 320 is similar to system 220 described above in that system 320 generates and outputs rollover mitigation implement adjustment control signals altering a state of an implement coupled to the vehicle. System 320 comprises a vehicle in the form of tractor 328 which is configured to be coupled to an implement.

Tractor 328 comprises a vehicle that may be employed in various settings such as an agricultural setting, a residential setting or a construction setting. Tractor 328 may be used for a variety of purposes in agricultural construction and residential purposes. Tractor 328 may be used to carry, push or pull an implement. Tractor 328 may include attachments, such as a bucket, blade, backhoe, or the like for digging, displacing, and/or carrying various materials such as earthen materials, animal waste and produce. Tractor 328 may include forks or other coupling mechanisms for engaging pallets, bins, boxes, or the like, wherein the tractor is to carry and/or lift the engaged items.

Tractor 328 comprises chassis 400, ground propulsion members 402, battery 404, torque source 406, transmission 408, wheel encoder 410, steering actuator 412, potentiometer 414, braking system 415, drive/steering controller 416, vehicle cab 418, GPS units 420-1 and 420-2 (collectively referred to as GPS units 420), camera units 422-1, 422-2 (collectively referred to as camera units 422), and IMUs 424-1, 424-2 (collectively referred to as IMUs 424) and mitigation controller 330.

Chassis 400 comprises a frame supporting the remaining components of tractor 328. In the example illustrated, chassis 400 comprises a front cargo bed 448 for storing and transporting cargo. In the example illustrated, chassis 400 is further configured for connection to an attachment/implement with a hitch or other mounting structure.

Ground propulsion members 402 comprise members that engage the underlying terrain and which are driven. In the example illustrated, ground propulsion members 402 comprise rear wheels 450 and front wheels 452. In the example illustrated, rear wheels 450 are driven by an electrical drive while front wheels 452 are manipulated or turned by steering actuator. In other implementations, ground propulsion members 402 may comprise tracks or other ground engaging members. As shown by FIG. 7, rear wheels 450 are supported by and/or driven by a rear axle 454.

Battery 404 comprises a battery unit that is removably received within a corresponding chamber or cavity extending rearwardly from the front of chassis 400. Battery 404 mates with a corresponding connection interface for transferring electrical power from battery 404 to the electrically powered components of tractor 328. In other implementations, battery 404 may be located at other locations. In other implementations, battery 404 may be fixed and non-swappable or not removable. In the example illustrated, battery 404 electrically powers an electric motor or motors that drive rear wheels 450.

Torque source 406 (schematically illustrated) comprises at least one electric motor powered by battery 404. In some implementations, the electric motor directly propels tractor 328. In some implementations, the electric motor drives a hydraulic pump that drives a hydraulic motor, wherein torque output by the hydraulic motor propels or assists in propelling tractor 328. In some implementations, wheels 450 of tractor 328 may alternatively be driven by an internal combustion engine and associated transmission or by a hybrid system using both a battery and an internal combustion engine.

The torque output by torque source 406 is transmitted to rear axle 454 by transmission 408 (schematically illustrated). Transmission 408 conducts torque from torque source 406 rear axle 454 and in some implementations may provide a plurality of gears or gear ratios delivering various amounts of speed and torque.

Wheel encoder 410 senses the rotation (revolutions per minute) of rear axle 454. Wheel encoder 410 is directly connected to or coupled to rear axle 454 to directly sense rotation of rear axle 454 and the rotation of rear wheels 450.

Steering actuator 412 comprises a device which applies force and motion to adjust the orientation of front wheels 452 to adjust the steering of tractor 328. Steering actuator 412 comprises mechanical, hydraulic or electric actuator (pump etc.) configured to rotate front wheels 452 to effectuate steering of tractor 328. In some implementations, steering actuator 412 may comprise a hydraulic pump and hydraulic cylinder-piston assemblies to adjust the orientation of front wheels 452.

Potentiometer 414 comprises one form of a wheel encoder that detects displacement. In some implementations, potentiometer 414 comprises a rotary potentiometer to measure rotational displacement. Potentiometer 414 detects the adjustment of the orientation of front wheels 452 to indicate a steering angle for tractor 328.

Braking system 415 (schematically illustrated), upon being actuated, slows or stops the rotation of rear wheels 450 and/or front wheels 452. In some implementations, braking system 415 may independently break the left tires relative to the right tires of tractor 328. Braking system 415 may comprise brakes may be in the form of hydraulic drum brakes, hydraulic disc brakes and/or air disc brakes. Brakes 409 may be selectively actuated and controlled by mitigation controller 330 to mitigate a potential rollover. In some implementations, braking system 415 may be directly controlled by mitigation controller 330. In some implementations, braking system 415 may be actuated or controlled by control signals from drive/steering controller 416.

Drive/steering controller 416 comprises a processing unit and associated non-transitory computer-readable medium containing instructions for directing the processing unit to output control signals for controlling torque source 406, transmission 408 and steering actuator 412. Such control signals may be generated in response to a computer program controlling automatic navigation and automated operations of tractor 328. In some modes or in some implementations, such control signals may be generated in response to inputs received from an operator remote from tractor 328, not residing in cab 418. In some modes or in some implementations, such control signals may be generated in response to inputs received from an operator providing input which is captured by camera unit 422. In some modes or in some implementations, such control signals may be generated in response to inputs from an operator residing within 418. For example, an operator may adjust a throttle which causes controller 416 to change the torque output by torque source 406. An operator may shift a gear which causes controller 416 up control signals adjusting transmission 408. An operator may turn a steering wheel or reposition a joystick causing controller 416 up control signals to steering actuator 412.

Cab 418 comprises a compartment in which an operator may be seated when operating tractor 328. Cab 418 comprises a seat 460, a steering wheel 462, a control console 464 and a roof 466. Roof 466 extends over control seat 460 and control console 464. In some implementations, roof 466 may be raised and lowered.

GPS units 420 are supported by roof 466. As schematically illustrated, each of GPS units 420 comprises a GPS antenna 470 and an inertial measurement unit (IMU) 472 housed in a single enclosure or housing 473. In some implementations, each GPS unit 420 is a commercially available GPS unit sold as a single component, having a reduced overall cost as compared to individual GPS antenna and IMUs. Signals from IMUs 472 are transmitted to rollover detection and mitigation controller 330.

In the example illustrated, GPS unit 420-1 is located at a front end of roof 466, forward of rear axle 454 while GPS unit 420-2 is located at a rear end of roof 466, rearward of rear axle 454.

Camera units 422-1 and 422-2 are supported by roof 466 at a front and a rear of roof 466, facing in forward and rearward directions, respectively. Camera unit 422-1 is positioned forward of rear axle 454 while camera unit 422-2 is supported rearward of rear axle 454. As schematically illustrated, each of camera units 422 comprises a camera 474 and inertial measurement unit 476. In some implementations, each of camera units 422 is a commercially available camera unit sold as a single component, having a reduced overall cost as compared to individual cameras and IMUs.

Camera 474 of camera unit 422-1 captures video or images in front of tractor 328. Camera 474 of camera unit 422-2 captures video images towards a rear of tractor 328. In some implementations, camera 474 may comprise a stereo camera capable of providing 2D images and 3D stereoscopic images for forming a 3D point cloud data. In other implementations, camera 474 may comprise a monocular camera for capturing 2D images and a separate camera sensor for capturing data for generating a 3D point cloud.

Inertial measurement units (IMUs) 476 of camera units output signals which may indicate or may be used to determine the roll and pitch of tractor 328 at the location of the individual IMUs. Signals from IMUs 476 are transmitted to rollover detection and mitigation controller 330.

IMUs 440 (schematically illustrated) are supported by roof 466 and provide inertial measurements at additional locations on roof 466. IMUs 440 may comprise gyroscopes and accelerometers. In the example illustrated, IMUs 440 are embedded within roof 466. Signals from IMUs 440 are transmitted to mitigation controller 330.

Mitigation controller 330 comprises processing unit 40 (described above) and a non-transferring computer-readable medium 344. Medium 344 is similar to mediums 44 and 244 in that medium 344 comprises rollover threat determination instructions 50 and rollover mitigation instructions 352. Rollover threat determination instructions 50 are described above with respect to FIGS. 2 and 5. The rollover threat determination instructions contained in medium 344 direct processing unit 40 to analyze the rollover symptom signals from rollover sensors in the form of IMUs 440, 472 and/or 476 to determine a rollover potential or threat for the vehicle.

The rollover threat determination instructions contained in medium 344 may direct processing unit 40 to identify the existence of an ongoing or forthcoming rollover about a longitudinal axis of the vehicle, a sideways rollover, based upon a measured roll rate, lateral acceleration and vehicle acceleration. An ongoing or forthcoming forward or rearward rollover about a lateral axis of the vehicle, a pitch rollover, may be determined based upon a sensed pitch rate, longitudinal acceleration and vertical acceleration of the vehicle.

In some implementations, the measurements may be conditioned using a Kalman filter such as an extended Kalman filter. The determination of the rollover threat may be based upon the current state of the vehicle, its current orientation, speed/trajectory, as well as the current planned future orientation and speed/trajectory, absent any new or unanticipated changes to the speed or steering of the vehicle. The rollover threat may be compared against a predefined safety threshold to determine whether any mitigation efforts are to be implemented by mitigation controller 330.

In some implementations, the predefined threshold may be based upon an identification or characteristics of the vehicle itself such as its size and weight distributions (center of mass). In some implementations, the predefined threshold may be additionally based upon any attachments/implements coupled to the vehicle. The predefined threshold may be based upon the height at which the implement is coupled to the vehicle, the size of the implement and the weight distribution of the implement.

In some implementations, the operator of the vehicle may be prompted to input an identification of the implement, wherein such characteristics of the implement are obtained from a local memory unit or wirelessly from a remote storage unit or server. In some implementations, instructions 50 may direct processing unit 40 to utilize one of cameras 474 to capture an image of the implement and to identify the implement. Once the implement is identified, a lookup table stored in medium 344 or stored in a remote storage may be accessed directly or wirelessly to determine the characteristics of the implement and to determine the predetermined threshold.

Rollover mitigation instructions 352 are similar to rollover mitigation instructions 52 and 252 described above. In response to a determined rollover threat exceeding a predefined safety threshold (as described above), rollover mitigation instructions 352 direct processing unit 40 to automatically output control signals to drive/steering controller 416 to automatically adjust torque source 406 and/or transmission 408 to adjust the speed of tractor 328 and/or to automatically adjust steering actuator 412 to adjust the steering or trajectory of tractor 328. In some implementations, drive/steering controller 416 may be omitted where its functions are carried out by processing unit 40 of mitigation controller 330.

Figure 9:
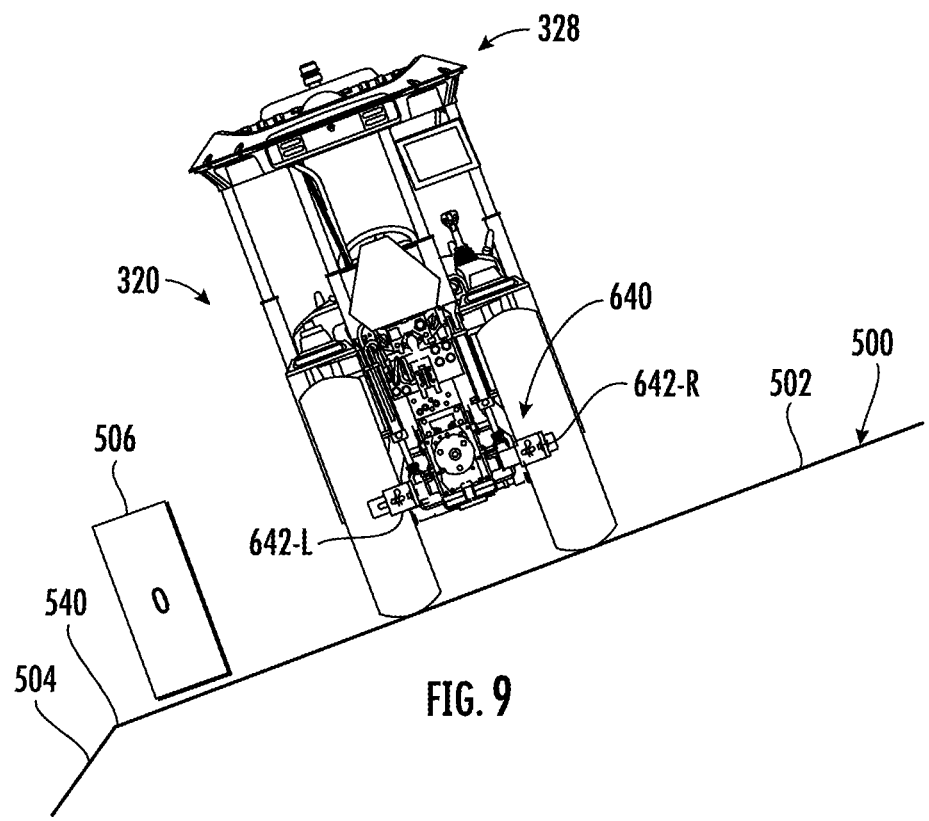
FIG. 9 is a rear view of the example vehicle rollover mitigation system of FIG. 7 experiencing a sideways rollover threat.
Figure 10:
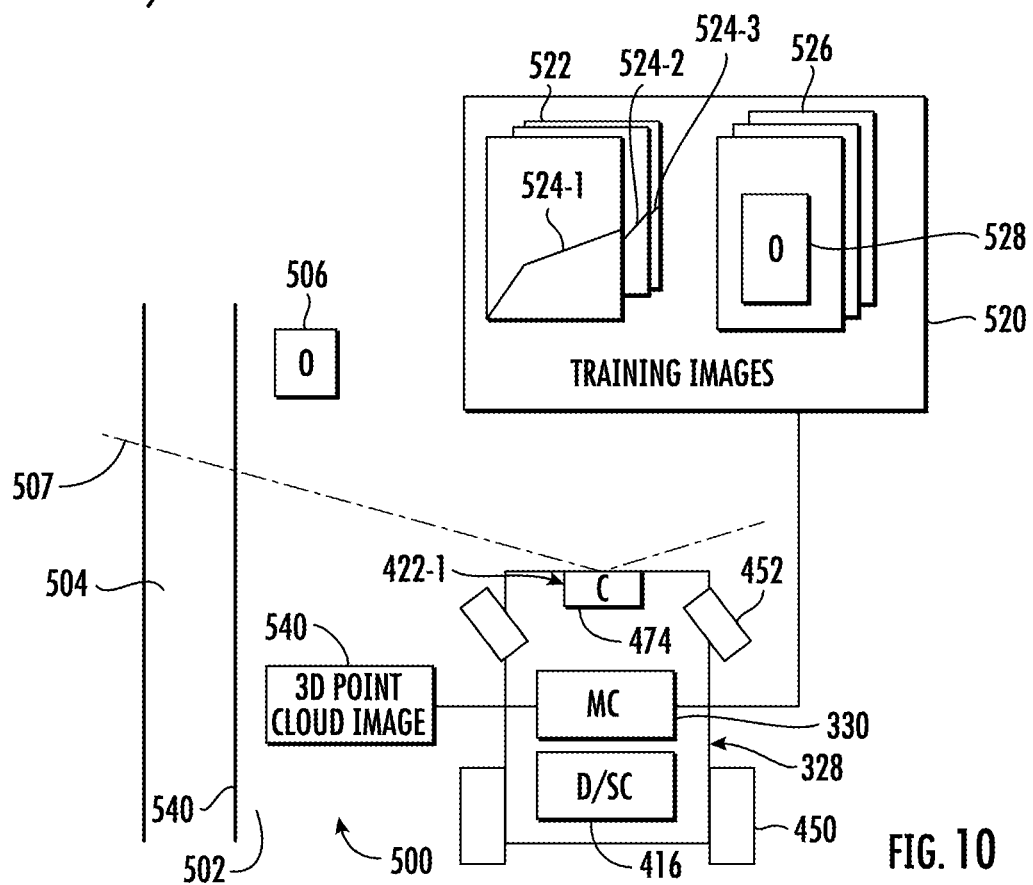
FIG. 10 is a top view schematically illustrating the example vehicle rollover mitigation system of FIG. 9.

As described above with respect to instructions 52, instructions 352 may further base any rollover mitigation adjustments to the speed and/or steering of tractor 328 upon vehicle environment signals from environment sensors in the form of cameras 474 or other environment sensors. FIGS. 9 and 10 illustrate an example of how rollover mitigation instructions 352 may direct processing unit 40 to output rollover mitigation control signals for mitigating a potential rollover of tractor 328 based upon rollover symptom signals from cameras 474.

FIGS. 9 and 10 illustrate tractor 328 traversing a terrain 500 having a first incline or slope 502 and an even more steep slope 504. FIGS. 9 and 10 further illustrate an object 506 (schematically illustrated) ahead of tractor 328, potentially lying within a possible path of tractor 328. Object 506 may comprise a person, an animal or an inanimate structure. In the example illustrated, the slope 502 of terrain 500 may be sufficient to cause a rollover threat for tractor 328 that exceeds a predetermined safety threshold. The threat may be so great that, without any further mitigation or correction actions, tractor 328 may be facing an impending sideways rollover about its longitudinal axis. In such a circumstance, processing unit 40, following rollover threat determination instructions 50, may determine the existence of the rollover threat. Mitigation controller 330 may determine the extent of the example sideways rollover threat based upon a measured roll rate, lateral acceleration and vehicle acceleration based upon signals IMUs 440, 472 and/or 476. As noted above, a Kalman filter may be used to condition the data received from the multiple IMUs. This impending rollover threat may trigger further action by mitigation controller 330 in accordance with rollover mitigation instructions 352.

In response to such a rollover threat, mitigation controller 330 may determine an initial mitigation action, and initial set of adjustments to the current speed and/or steering of tractor 328 to mitigate the rollover, such as preventing the rollover, delaying the rollover and/or reducing the moment causing the rollover. The initial mitigation action may be based upon the determined extent of the threat, the current orientation of tractor 328, the current steering of tractor 328 and/or the current speed of tractor 328. In the example illustrated, the initial set of adjustments to mitigate a sideways rollover on a slope may comprise slowing the speed of tractor 328 and may further comprise steering towards the downslope, the lower side of the slope for a short distance, and differentially brake the left and right wheels. As shown by FIG. 10, front wheels 452 are steered in a direction towards the lower side of slope 502 in an effort to counter an impending rollover.

Mitigation controller 330 may further evaluate the environment surrounding tractor 328 to determine whether the initial mitigation action may require further adjustment due to the surrounding environment. In the example illustrated, the surrounding environment, regions forward of tractor 328, when tractor 328 is traveling in a forward direction, are evaluated based upon two-dimensional (2D) images captured by camera 474 of camera unit 422-1 and stereo image also captured by camera 474 of camera unit 422-1. Any terrain or objects within the field of view 507 of camera 474 may be evaluated. The 2D images are evaluated by processing unit 42 identify and classify terrain 500 and object 506. For example, a 2D image captured by camera 474 may be evaluated by processing unit 40 on a pixel-by-pixel basis or other image processing techniques to identify the presence of terrain 500 and object 506. In the example illustrated, processing unit 40 and mitigation controller 330 may be part of a neural network which has been trained based upon a set of training images 520 to identify and distinguish different possible terrains and different possible objects. In the described example, training images 520 may comprise a first set 522 of training images depicting different terrains 524-1, 524-2, 524-3 . . . 524-n with different associated and recorded slopes and a second set 526 of training images depicting different objects 528 having associated and recorded identities. Such training images may be utilized by processing unit to then identify slope 500 and object 506.

Using the stereoscopic image provided by camera 474, processing unit 40 may generate a 3D point cloud image 540 corresponding 2D image depicting terrain 500 and object 506. Processing unit 40 may utilize 3D point cloud image to determine distances from changes terrain 500 to tractor 328 and the distance from object 506 to tractor 328. Using the data acquired from the 2D images and the 3D point cloud image 540, mitigation controller 330 may determine the extent of the change in slope 504 from 502 and the relative location of slope 504 to tractor 328.

Based upon such information, mitigation controller 330 may adjust the initial mitigation action to avoid driving tractor 328 over edge 540 separating slope 502 from the steeper slope 504. In some implementations, the change in slope may be restricted to a small region, wherein the timing at which the initial mitigation actions are made to mitigate rollover is adjusted such that the path of tractor 328 avoids the small region where drop-off occurs. In some circumstances, edge 540 may be continuous, wherein the initial mitigation action may be adjusted to cause a smaller steering angle adjustment to avoid crossing the continuous edge 540.

Based upon information from the 2D image and the computed, or measured, 3D point cloud image of edge 540, mitigation controller 330 may determine the type of object 506 and its relative location with respect to tractor 328. Using such information, mitigation controller 330 may adjust the initial mitigation action such that the path of tractor 328 does not intersect the object 506. For example, where the initial mitigation action might result in a path that intersects object 506, mitigation controller 330 may further alter the mitigation control signals to alter the steering and speed of tractor 328 and to alter the future path of tractor 328 so as to not intersect object 506.

In some implementations, rollover mitigation instructions 352 may direct processing unit 40 to evaluate potential outcomes for different possible steering and speed adjustments in response to an impending rollover and to select a particular steering and speed adjustment that results in the least amount of harm. In some circumstances, a scenario may present itself where a rollover may not be completely avoided or where it is impossible to avoid all objects during a correction or without any corrective action. In such circumstances, controller 330 may identify the future action (future path of tractor 328) which results in the lowest cost. For example, a first steering and/or speed adjustment may be chosen which results in the vehicle hitting a low value inanimate structure, wherein the first steering and/or speed adjustment is chosen over a second possible steering and/or speed adjustment which would result in the vehicle hitting a person. As part of the evaluation, controller 330 may select the steering and/or speed adjustment based upon a classification of the object 506, a determined or human assigned value or priority of the object 506 and/or the likelihood or chance of the object 506 being struck by the vehicle. Instructions 352 may be configured to output mitigation control signals such that any future action taken is one that achieves the lowest "cost" in life and/or monetary values. For example, in some circumstances, object 506 may comprise a low-cost inanimate structure, wherein damage to the tractor hitting the object 506 may be less than the cost of a rollover which might occur when tractor 328 is steered to avoid object 506. In such circumstances, the initial mitigation action may be carried out even though object 506 might be struck. In some circumstances, object 506 may comprise a person, wherein the initial mitigation action would be further altered to avoid hitting the person despite the high cost of a rollover.

Figure 11:
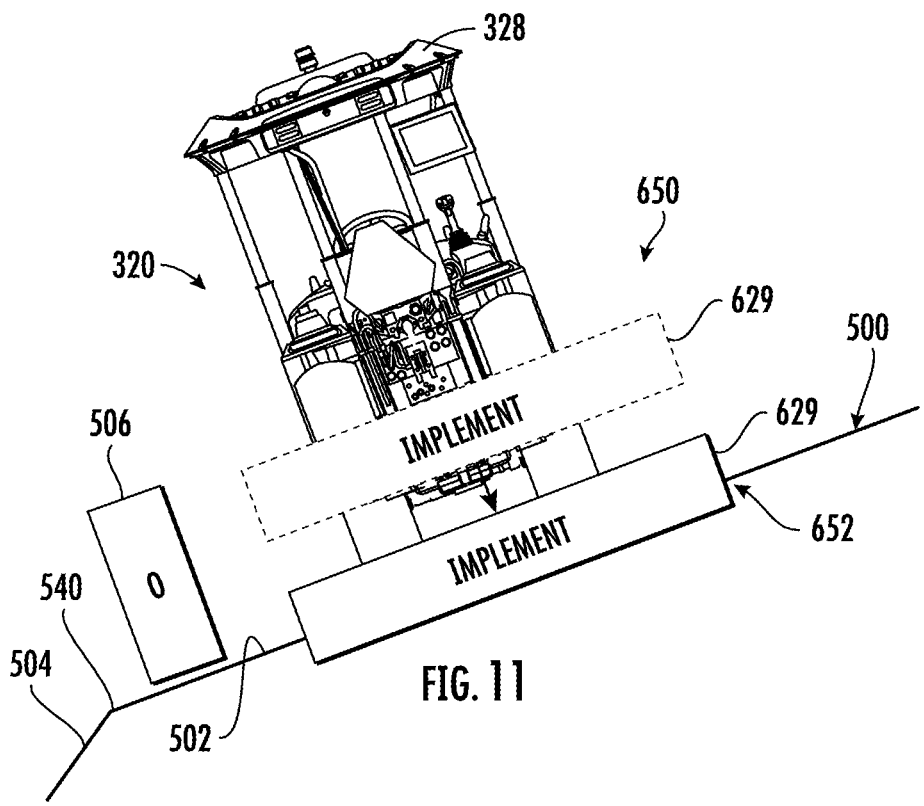
FIG. 11 is a rearview of the example vehicle rollover mitigation system of FIG. 7 altering a height of an implement to counter a sideways rollover threat.

In addition to altering the steering and/or speed of tractor 328 to counter a potential rollover threat, mitigation controller 330 may further output mitigation control signals that alter a state of an implement coupled to tractor 328. FIG. 11 illustrates an example implement 629 coupled to tractor 328 as tractor 328 is traversing terrain 500 with an object 506 located forward of tractor 328 as seen in FIG. 10. As described above, slope 502 of terrain 500 may result in mitigation controller 330 identifying a sufficient rollover threat to justify a mitigation action. As described above, the initial mitigation action may include an adjustment to the speed and/or steering of tractor 328. This mitigation action may be further adjusted based upon the detected environment of tractor 328 so as to avoid object 506 or slope 504. In the example illustrated, the mitigation action may further include altering a state of the example implement 629.

Implement 629 comprises an attachment that is carried by tractor 328. In the example illustrated, tractor 328 comprises a three-point hitch 640 having lower links 642-L and 642-R (shown in FIG. 9) which supports implement 629. As shown by FIG. 11, in response to determining the existence of a sufficiently high rollover threat, mitigation controller 330 may output control signals causing the three-point hitch 640 to lower implement 629 from a first position 650 (shown in broken lines) to a second lower position 652. The lower position 652 results in implement 629 having a lower center of gravity relative to terrain 500 which may assist in countering the rollover threat. In the example illustrated, implement 629 is lowered to a position in which portions of implement 629 physically contact the underlying terrain 500. In the example illustrated, implement 629 is lowered to an extent such that portion of implement 629 extends below the surface of terrain 500. For example, implement 629 may comprise a tillage implement configured to till the underlying soil when in the lower position 652. In other implementations, the lowering of implement 629 results in implement 629 remaining above terrain 500, but closer to terrain 500.

Figure 12:
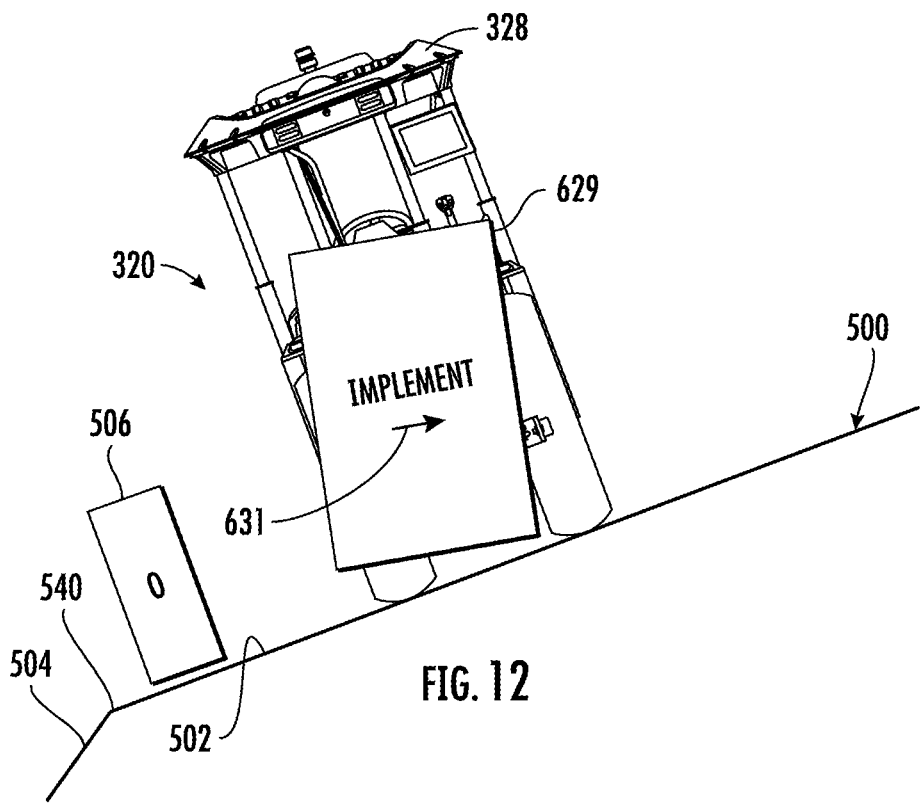
FIG. 12 is a rear view of the example vehicle rollover mitigation system of FIG. 7 altering an orientation of an implement to counter a sideways rollover threat.

FIG. 12 illustrates another example mitigation action which may be taken by controller 330 in response to a detected rollover threat. In the example illustrated, mitigation controller 330 automatically outputs control signals to alter an orientation of implement 629 relative to tractor 328 and relative to the underlying terrain 500. In the example illustrated, mitigation controller 330 outputs control signals causing lower links 642 (shown in FIG. 9) to be moved to different relative heights, rotating implement 629 in a clockwise direction as seen in FIG. 12. In particular, implement 629 is rotated in a direction such that the side of implement 629 towards the upslope of terrain 500 is closer to the ground. This orientation results in the center of gravity of implement 629 being moved in a direction away from the rollover direction as indicated by arrow 631 to assist in countering a potential rollover of tractor 328.

Figure 13:
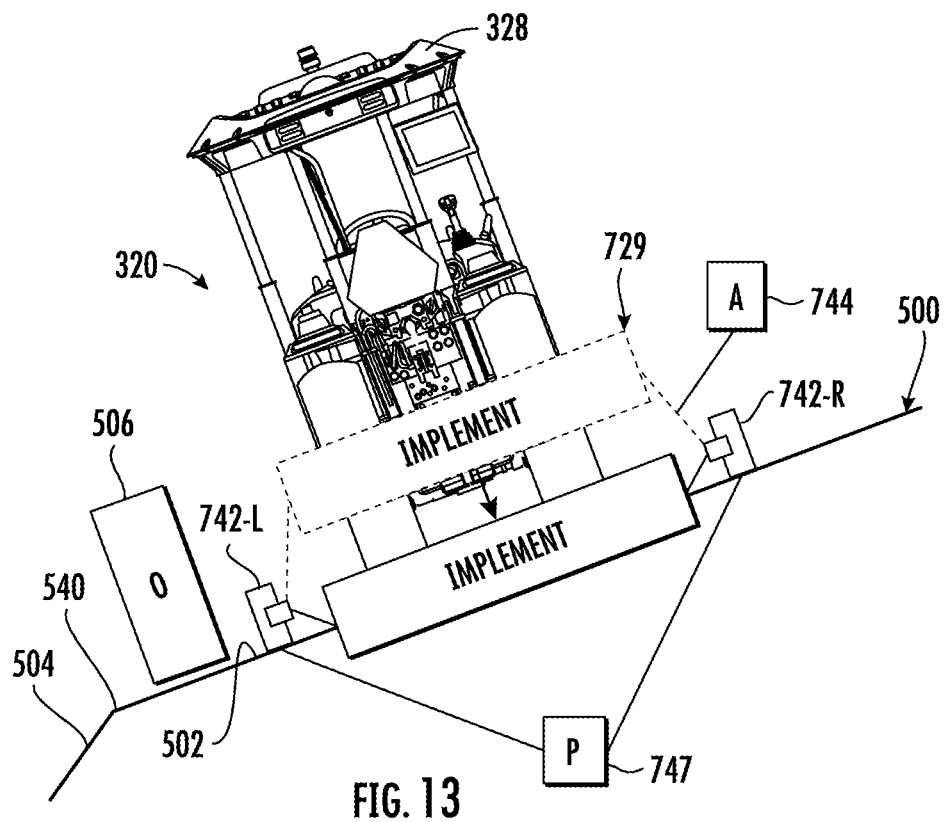
FIG. 13 is a rearview of the example vehicle rollover mitigation system of FIG. 7 altering a height of an implement to counter a sideways rollover threat.

FIG. 13 illustrates an example of mitigation controller 330 automatically outputting mitigation control signals in response to a determined sideways rollover threat to adjust the state of implement 729 being pulled by tractor 328. In the example illustrated, implement 729 comprises two opposite side wheels 742-L, 742-R (collectively referred to as wheels 742) and actuator 744. Wheels 742 are located at opposite sides of the frame 743 of implement 729 and are vertically movable relative to the frame 743 of implement 729. For example, each of wheels 742 may comprise pivot joints which facilitate pivoting of wheel 742 about a transverse axis of implement 729.

Actuator 744 comprises a device that, in response to signals from tractor 328, may pivot or raise/lower wheels 742 in unison or relative to one another to raise and lower the supported frame 743. In one implementation, actuators and 44 comprises a hydraulic cylinder-piston assembly having a first end connected to a wheel 742 and a second end connected to frame 743 or other portions of the remainder of implement 729. In yet other powered mechanical device to independently raise and lower wheels 742.

In the example illustrated, in response to a sideways rollover threat, mitigation controller 330 may output mitigation control signals that cause actuator 744 to uniformly lower the frame 743 (shown with a block diagram) relative to the wheels 742. The lower center of gravity of implement 729, and the moment created from the reaction of the wheel on the ground, assist in countering any rollover of tractor 328. In some implementations, the inflation level of tires 452 may be adjusted in response to control signals output by mitigation controller 330. For example, in some implementations, mitigation control signals from mitigation controller 330 may cause a pneumatic pump 747, carried by implement 729) to deflate tires 452 to lower frame 743 of implement 729 to lower the center of gravity of influence 729 and to assist in countering any rollover of tractor 328.

Figure 14:
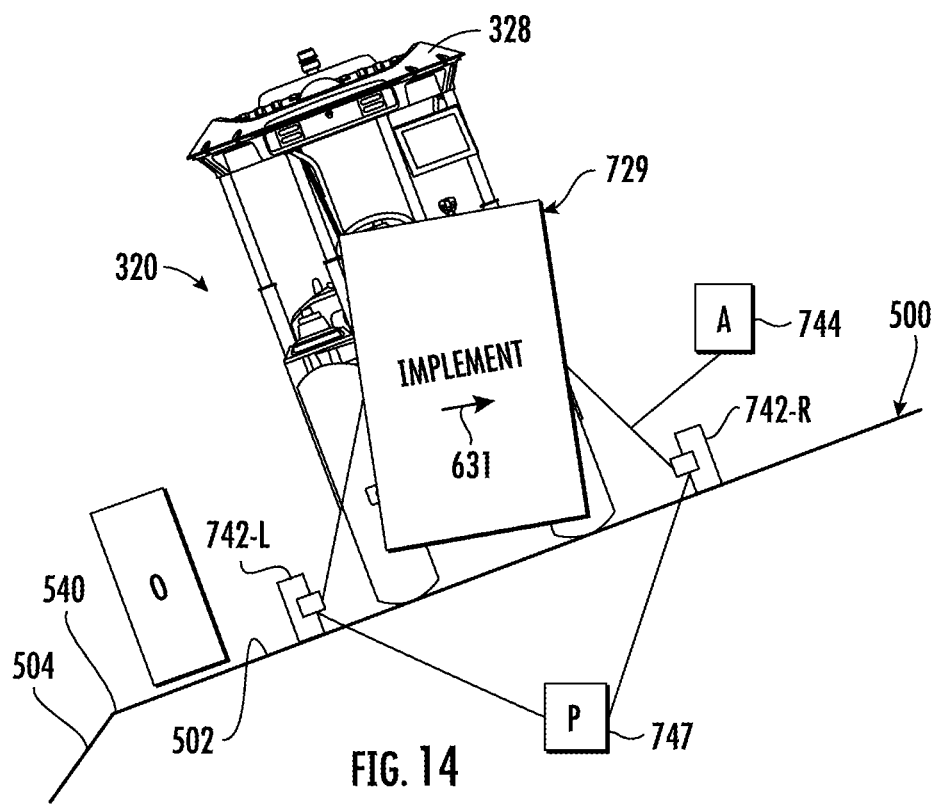
FIG. 14 is a rear view of the example vehicle rollover mitigation system of FIG. 7 altering an orientation of an implement to counter a sideways rollover threat.

FIG. 14 illustrates an example of the state of implement 729 being altered automatically in response to a detected rollover threat for tractor 328. In the example illustrated, in response to mitigation control signals from mitigation controller 330, actuator 744 differently elevates portions of frame 743 relative to wheels 742 to alter the orientation of implement 729, to rotate implement 729 in a clockwise direction about its longitudinal axis such that the side of frame 743 close to wheel 742-R is closer to the underlying terrain 500 as compared to the other side of frame 743 of implement 729. The new orientation of implement 729 results in the center of gravity of implement 729 being moved in a direction away from the rollover direction as indicated by arrow 631 to assist in countering rollover of tractor 328. In some implementations, mitigation controller 330 may further output control signals which cause hydraulic cylinders 747 to differently raise and lower wheels 742 to rotate frame 743 of implement 729 to a new orientation to assist in countering any rollover of tractor 328.

Figure 15:
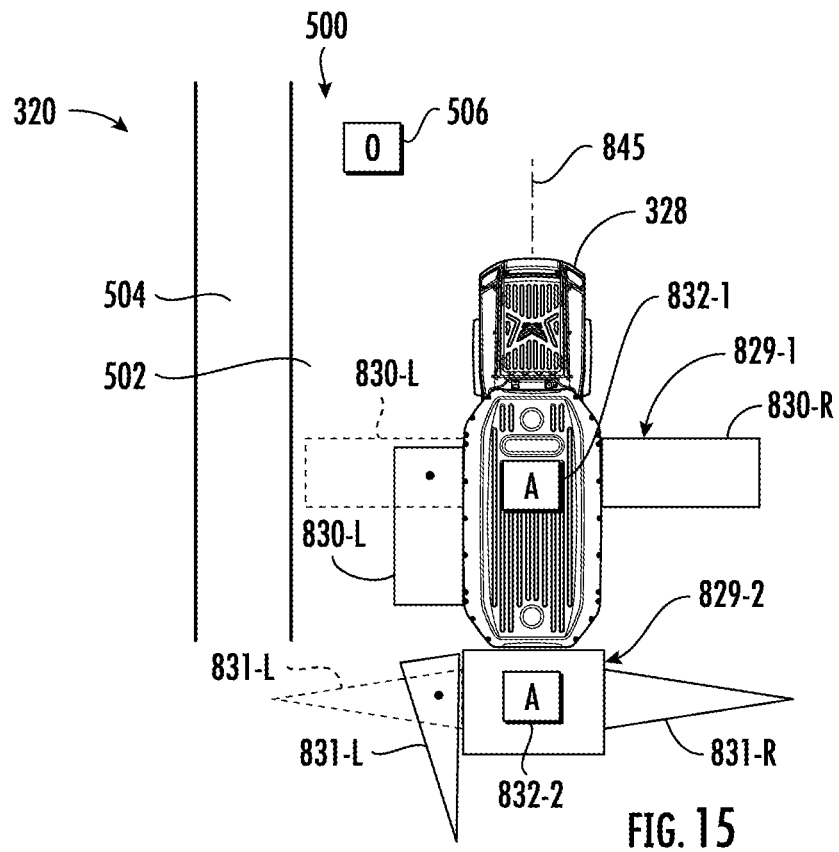
FIG. 15 is a top view of the example vehicle rollover mitigation system of FIG. 7 altering an extended state of an implement to counter a sideways rollover threat.

FIG. 15 illustrates an example of mitigation controller 330 outputting control signals causing a state of implement 829-1 and 829-2 (collectively referred to as implements 829) being automatically altered or adjusted in response to a detected rollover threat for tractor 328. Implement 829-1 comprises an implement that is mounted or cantilevered from one side or both sides of tractor 328. In the example illustrated, implement 829-1 comprises booms 830-L and 830-R (collectively referred to as booms 830).

Implement 829-2 comprises an implement that is pulled or towed by tractor 328. Implement 829-2 comprises booms 831-L and 831-R (collectively referred to as booms 831). Implements 829 may latterly extend to sides of tractor 328 for carrying out various applications to the sides of tractor 328. Such applications may include spraying, mowing, pruning and/or tillage. FIG. 15 illustrates booms 830 and 831 all in an extended state prior to a detected rollover threat. For example, prior to a detected rollover threat, each of booms 830 and 831 may be extended while performing operations on the lateral sides of tractor 328.

As shown by FIG. 15, in response to a detected rollover threat for tractor 328, mitigation controller 330 may automatically output control signals that adjust stanchions or booms of implement 829 between extended and retracted states. An extended state is one in which outer extremities of the extension or boom are transversely spaced from the longitudinal centerline of 845 tractor 328 by a first distance, whereas a retracted state is one in which outer extremities of the extension or boom are transversely spaced from the longitudinal centerline 845 of tractor 328 by a second distance less than the first distance.

In response to a detected rollover threat, mitigation roller 330 may automatically output control signals that cause those booms projecting towards or closer to the rollover direction (to the left in FIG. 15 towards the downside of a slope) to move away from the direction of rollover (to the right in FIG. 15) to stabilize tractor 328. In the example illustrated, mitigation controller 330 may output control signals to actuators 832-1 and 832-2 (in the form of hydraulic-pneumatic cylinder-piston assemblies, solenoids or other actuation devices) to pivot booms 830-L and 831-L in a counter-clockwise direction (as seen in FIG. 15), from the extended state shown in broken lines to the retracted state shown in solid lines. Booms 830-L and 831-L are moved away from the down-side of the slope, to move the outer extremities of booms 830-L and 831-L towards the longitudinal centerline of tractor 328.

Although booms 830 and 831 are illustrated and described as pivoting between the extended state and the retracted state, in other implementations, the booms or other extension structures of implement 829 may be actuated between extended and retracted states in other fashions. For example, booms 830 and 831 may be pivoted so as to project forwardly along the sides of tractor 828, may be raised (pivoted about a horizontal axis) or lowered (pivoted about a horizontal axis) between an extended state and retracted state. In some implementations, portions of booms 830 and 831 may be folded and unfolded to move such booms between extended and retracted states. In implementations where booms 830-L and 830-L are telescopic, controller 330 may output control signals causing actuators 832-1 and 832-2 to telescopically retract the outer ends of such booms 830-L and 831-L towards the longitudinal centerline of tractor 328.

Figure 16:
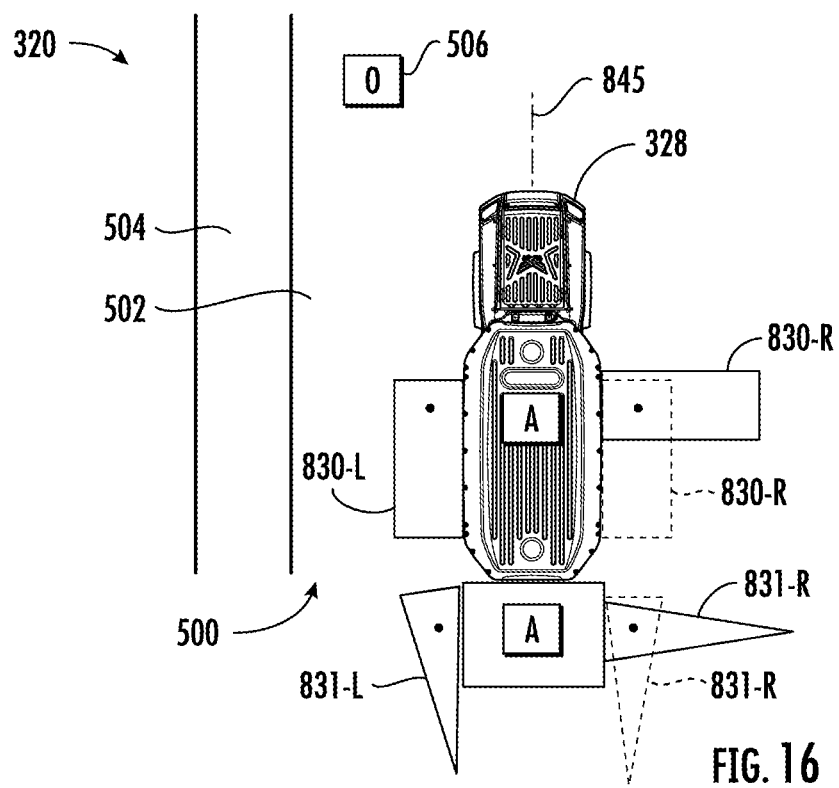
FIG. 16 is a top view of the example vehicle rollover mitigation system of FIG. 7 altering an extended state of an implement to counter a sideways rollover threat.

FIG. 16 illustrates an example scenario where tractor 328 booms 830 and 831 are in a retracted state prior to a detected rollover threat. For example, during transport of implement 829 and/or while tractor 328 is being driven to a field, orchard or vineyard, implement 829 may be inactive with their respective booms 830 and 831 in retracted states, closer to the logical centerline of tractor 328.

As shown by FIG. 16, upon mitigation controller 330 detecting a rollover threat, controller 330 may automatically output control signals causing actuators to pivot booms 830-R and 831-R in a clockwise direction (as seen in FIG. 16), from the retracted state shown in broken lines to the extended state shown in solid lines. Booms 830-R and 831-R are moved away from the down-side of the slope, to move the outer extremities of booms 830-R and 831R away from the direction of the rollover and away from the longitudinal centerline of tractor 328. In implementations where booms 830-R and 831-R are telescopic, controller 330 may output control signals causing actuators 830-R and 831-R to telescopically retract the outer ends of such booms 830-R and 831-R towards the longitudinal centerline of tractor 328.

Figure 17:
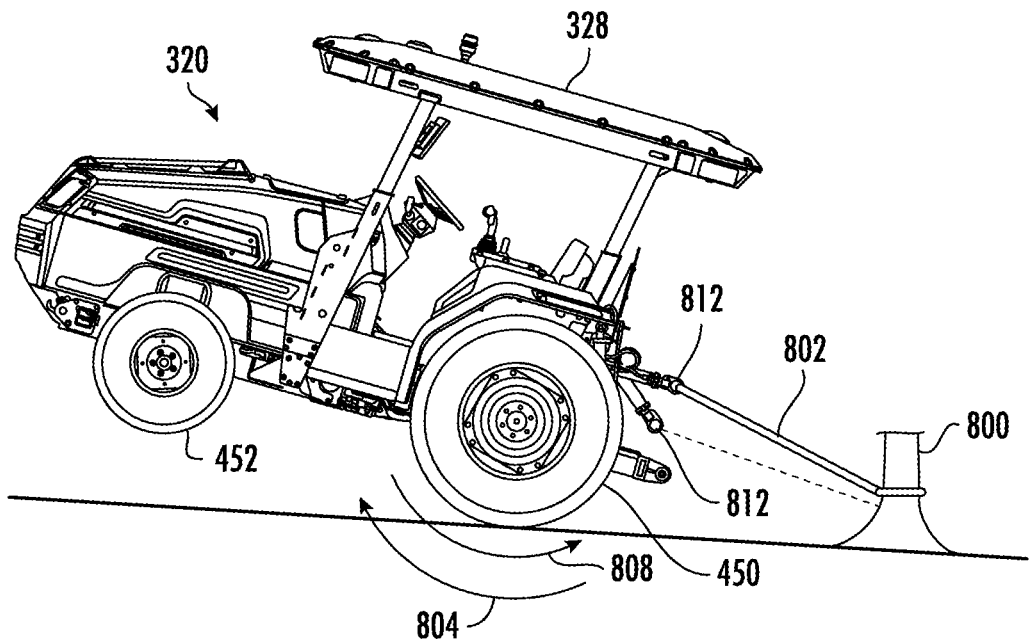
FIG. 17 is a side view of the example vehicle rollover mitigation system of FIG. 7 experiencing and countering a pitch rollover threat.

FIG. 17 illustrates an example of mitigation controller 330 outputting control signals to automatically respond to a pitch rollover threat. FIG. 17 illustrates an example where vehicle 328 is coupled to a structure 800 via a flexible line 802. In the example illustrated, structure 800 comprises a tree stump, wherein tractor 328 is attempting to pull out the tree stump. In the example illustrated, flexible line 802 may be in the form of a table, rope, chain or the like. As shown by FIG. 17, the forward torque applied to rear wheels 450 in the direction indicated by arrow 804 results in tractor 328 pivoting or pitching about a transverse axis of tractor 328.

Mitigation controller 330 may identify a pitch rollover threat based upon rollover symptom signals received from rollover sensors in the form of IMUs 440, 472 and 476. An ongoing or forthcoming forward or rearward rollover about a lateral axis of the vehicle, a pitch rollover, may be determined based upon a sensed pitch rate, longitudinal acceleration and vertical acceleration of the vehicle as determined from signals received from the gyros and accelerometers of the IMUs. In some implementations, different data values may be conditioned using a Kalman filter, such as an extended Kalman filter.

In automatic response to a determination that the pitch rollover threat is sufficiently high, exceeding a predetermined threshold, mitigation controller 330 may output mitigation control signals to drive/steering controller 416 which reverses the torque applied to rear wheels 450 such that a torque is applied in the direction indicated by arrow 808. Because tractor 328 relies upon a battery-powered electric motor to supply torque to rear wheels 450, the reversal of torque supplied by the electric motor and applied to wheel 450 may be made in less than 1.5 seconds following the rollover threat determination. This response time may be on the order of 10 times or more faster than response time for a torque reversal for a torque source powered by an internal combustion engine.

As further shown by FIG. 17, mitigation controller 330 may further output mitigation control signals that cause tractor 328 to lower the connection point 812 for flexible line 802. By lowering the connection point 812, mitigation controller 330 reduces the forces causing pitch rollover threat.

Figure 18:
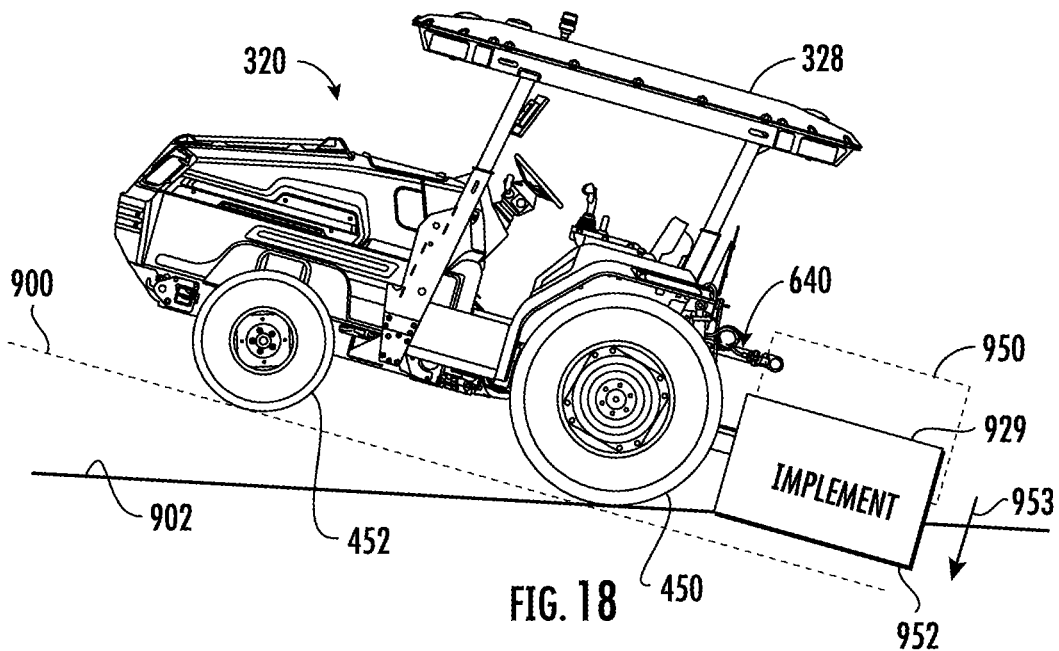
FIG. 18 is a side view of the example vehicle rollover mitigation system of FIG. 7 experiencing and countering a pitch rollover threat.

FIG. 18 illustrates an example of mitigation controller 330 outputting mitigation control signals to respond to a pitch rollover threat for tractor 328. In some circumstances, tractor 328 may be experiencing a pitch rollover threat due to traveling up an incline 900. In some circumstances, tractor 328 may experience a pitch rollover threat to the weight of a carried load or implement 929.

In response to determining that a rollover threat exceeds a predetermined threshold, mitigation controller 330 may output mitigation control signals that cause lowering of the implement 929 from the first height 950 to the second lower height 952 as indicated by arrow 953. In some implementations, such control signals cause a three-point hitch 640 to lower implement 929. In some implementations, the control signals may cause an actuator, such as actuator 744 (shown in FIG. 13), to lower implement 929. In some implementations, implement 929 may be lowered into physical contact with the underlying terrain 900 (or 902). In some implementations, implement 929 may be lowered such that portions of the implement project into or extend below the surface of the underlying terrain 900 or 902. The lower center of gravity of implement 929 may assist in countering or limiting the pitch rollover.

Figure 19:
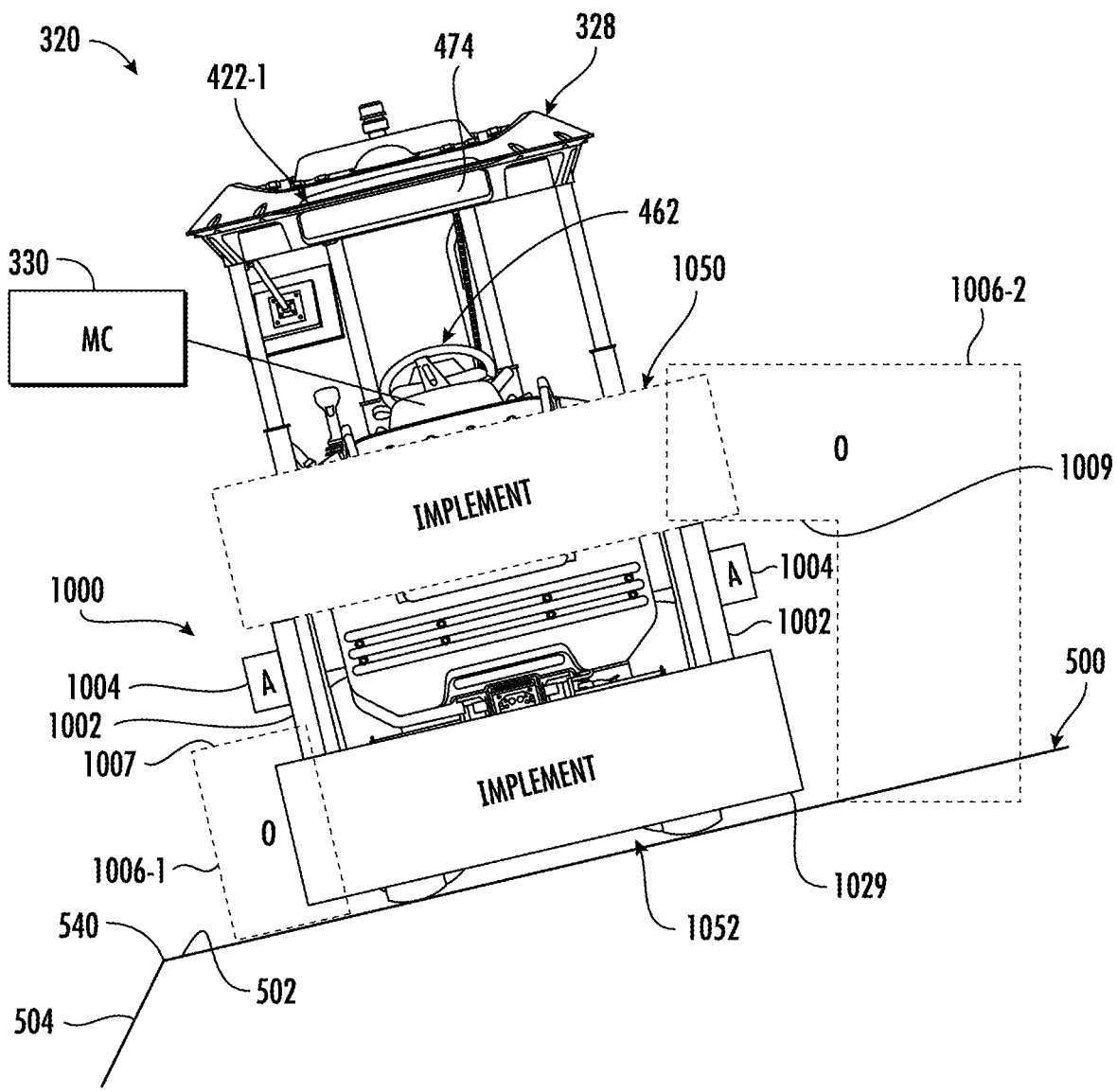
FIG. 19 is a front view of the example vehicle rollover mitigation system of FIG. 7 altering a height of a front implement to counter a sideways rollover threat.

FIG. 19 illustrates an example implement 1029 coupled to tractor 328 as tractor 328 is traversing terrain 500. As described above, the slope 502 of terrain 500 may result in mitigation controller 330 identifying a sufficient rollover threat to justify a mitigation action. As described above, the initial mitigation action may include an adjustment to the speed and/or steering of tractor 328. This mitigation action may be further adjusted based upon the detected environment of tractor 328 so as to avoid object 506 or slope 504. In the example illustrated, the mitigation action may further include altering a state of the example implement 1029.

Implement 1029 comprises an attachment that is carried by tractor 328 at the front of tractor 328. In the example illustrated, tractor 328 comprises a front lift mechanism 1000 pivotably coupled to the chassis of tractor 328 and extending to a front of tractor 328. Front lift mechanism 1000 is configured to be releasably attached to an implement, such as implement 1029, at the front of tractor 328. In such an implementation, implement 1029 serves as a working tool or attachment. Implement 1029 may comprise a bucket, fork, blade or other tool. Front lift mechanism 1000 facilitates tractor 328 serving as a front loader tractor.

Lift mechanism 1000 is configured to controllably raise and lower implement 1029. In the example illustrated, lift mechanism 1000 comprises lift links 1002 and actuators 1004 (schematically illustrated). Lift links 1002 comprise a plurality of links or arms pivotably connected to one another for articulation. Actuators 1014 comprise mechanisms to selectively pivot and/or articulate the links 1002 relative to the chassis of tractor 328 and relative to one another to raise and lower implement 1029. In some implementations, actuators 1004 comprise hydraulic or pneumatic piston-cylinder assemblies. In other implementations, actuators 1004 may comprise other mechanisms. In some implementations, lift mechanism 1000 is additionally configured to pivot implement 1029 relative to lift links 1002. In such an implementation, lift mechanism 1000 may include additional actuators, such as additional hydraulic or pneumatic cylinder-piston assemblies to pivot implement 1029 relative to lift links 1002.

As shown by FIG. 19, in response to determining the existence of a sufficiently high rollover threat, mitigation controller 330 may output control signals causing the lift mechanism 1000 to lower implement 1029 from a first position 1050 (shown in broken lines) to a second lower position 1052. In some implementations, the height of implement 1029 at the first position 1050 may be height at which there is little or no rollover risk in a forward or backward direction when tractor 328 is traversing a substantially level terrain. However, due to the lateral or sideways slope of terrain 500, a sideways rollover risk may be present. The lower position 1052 of implement 1029 results in implement 1029 having a lower center of gravity relative to terrain 500 which may assist in countering the sideways rollover threat. In the example illustrated, implement 1029 is lowered from the first position 1050 at which a top of the implement 1029 is below a top of the steering wheel 462 to a lowered position 1052, a position in which bottom portions of implement 1029 extend below a top of front wheels 452, and in some implementations, below the rotational axis of front wheels 452.

Mitigation controller 330 may further evaluate the environment surrounding tractor 328 to determine whether the initial mitigation action, such as lowering implement 1029, may require further adjustment due to the surrounding environment. In the example illustrated, the surrounding environment, regions forward of tractor 328, when tractor 328 is traveling in a forward direction, are evaluated based upon two-dimensional (2D) images captured by camera 474 of camera unit 422-1 and stereo image also captured by camera 474 of camera unit 422-1. Any terrain or objects within the field of view 507 of camera 474 may be evaluated. The 2D images are evaluated by processing unit 40 to identify and classify terrain 500 and any objects within or near the upcoming path of tractor 328. For example, a 2D image captured by camera 474 may be evaluated by processing unit 40 on a pixel-by-pixel basis or other image processing techniques to identify the presence of terrain 500 and any upcoming objects. In the example illustrated, processing unit 40 and mitigation controller 330 may be part of a neural network which has been trained based upon a set of training images 520 to identify and distinguish different possible terrains and different possible objects (as shown and described above with respect to FIG. 10).

Using the stereoscopic image provided by camera 474, processing unit 40 may generate a 3D point cloud image 540 corresponding 2D image depicting terrain 500 and any upcoming objects. Processing unit 40 may utilize 3D point cloud image to determine distances from any objects to tractor 328. Using the data acquired from the 2D images and the 3D point cloud image 540, mitigation controller 330 may determine the size, shape and locational coordinates of any upcoming objects, including a height of lowermost edges of any upcoming objects and a height of any uppermost edges or surfaces of upcoming objects.

Based upon information from the 2D image and the computed, or measured, 3D point cloud image of edge 540, mitigation controller 330 may determine the type of object 506 and its relative location with respect to tractor 328. Using such information, mitigation controller 330 may adjust the initial mitigation action such that the path of tractor 328 does not intersect any upcoming object. For example, where the initial mitigation action might result in the implement being raised or lowered to a height at which the implement 1029 may intersect an upcoming object, mitigation controller 330 may further alter the mitigation control signals to alter a path of tractor 328 and/or alter any height adjustment of implement 1029.

FIG. 19 illustrates two hypothetical objects or obstacles that may, in particular circumstances, intersect the path of implement 1029 carried by tractor 328. FIG. 19 illustrates a first hypothetical object 1006-1 which rises up from the underlying terrain 500 and has a top surface 1007 at a first height above the underlying terrain 500. In the example illustrated, mitigation controller 330 may determine or identify the presence of sideways rollover risk due to the slope of terrain 500. One option for mitigating such a risk may be for controller 330 to lower implement 1029 to the lowered position 1052. However, based upon the identified presence of obstacle 1006-1 having a top surface 1007, mitigation controller 330 may alter the initial overall mitigation action such that implement 1029 is not lowered to position 1052 or such that the extent to which implement 1029 is lowered is such at its lower most extent is at a height above the height of top surface 1007, so as to move over the top of object 1006-1 as tractor 328 travels forward.

FIG. 19 further illustrates a second hypothetical obstacle 1006-2 is located or has a shape such that portions of the obstacle 1006-2 may intersect the path of implement 1029 depending upon a height at which implement 1029 is supported. Independent of the presence of a sideways rollover risk, mitigation controller 330 may automatically output control signals to lower implement 1029 to the lowered position 1052 or to lower limit 1029 at least extent that the uppermost surfaces are portions of implement 1029 will be at a height lower than the lowermost surface 1009 of obstacle 1006-2 when passing obstacle 1006-2, such that implement 1029 passes below the overhanging portions of obstacle 1006-2.

In some implementations, rollover mitigation instructions 352 may direct processing unit 40 to evaluate potential outcomes for different possible steering and speed adjustments in response to an impending rollover and to select a particular steering and speed adjustment that results in the least amount of harm. In some circumstances, a scenario may present itself where a rollover may not be completely avoided or where it is impossible to avoid all objects during a correction or without any corrective action. In such circumstances, controller 330 may identify the future action (the height of implement 1029) which results in the lowest cost.

For example, a first height for implement 1029 may be chosen which results in the implement 1029 hitting a low value inanimate structure, wherein the first height for implement 1029 is chosen over a second possible height for implement 1029 which would result in the vehicle hitting a person or a more valuable obstacle. As part of the evaluation, controller 330 may select the height for implement 1029 based upon a classification of the obstacles, a determined or human assigned value or priority of the objects and/or the likelihood or chance of the objects being struck by the tractor 328 or its implement 1029 at a particular height. Instructions 352 may be configured to output mitigation control signals such that any future action taken is one that achieves the lowest "cost" in life and/or monetary values. For example, in some circumstances, such objects may comprise a low-cost inanimate structure, wherein damage to the tractor 328 or implement 1029 hitting a particular object may be less than the cost of a rollover which might occur when implement 1029 is moved to height to mitigate any rollover risk. In such circumstances, the initial mitigation action may be carried out even though the particular object might be struck by implement 1029.

Figure 20:
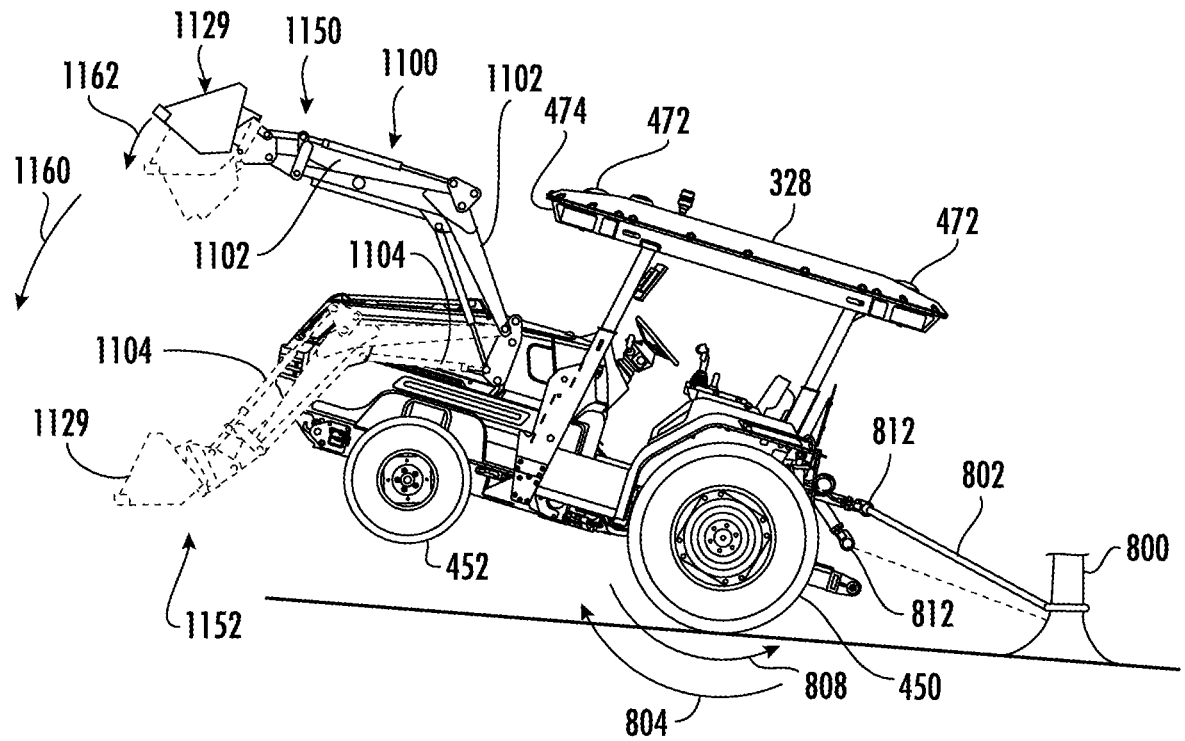
FIG. 20 is a side view of the example vehicle rollover mitigation system of FIG. 7 experiencing and countering a pitch rollover threat.
Figure 21:
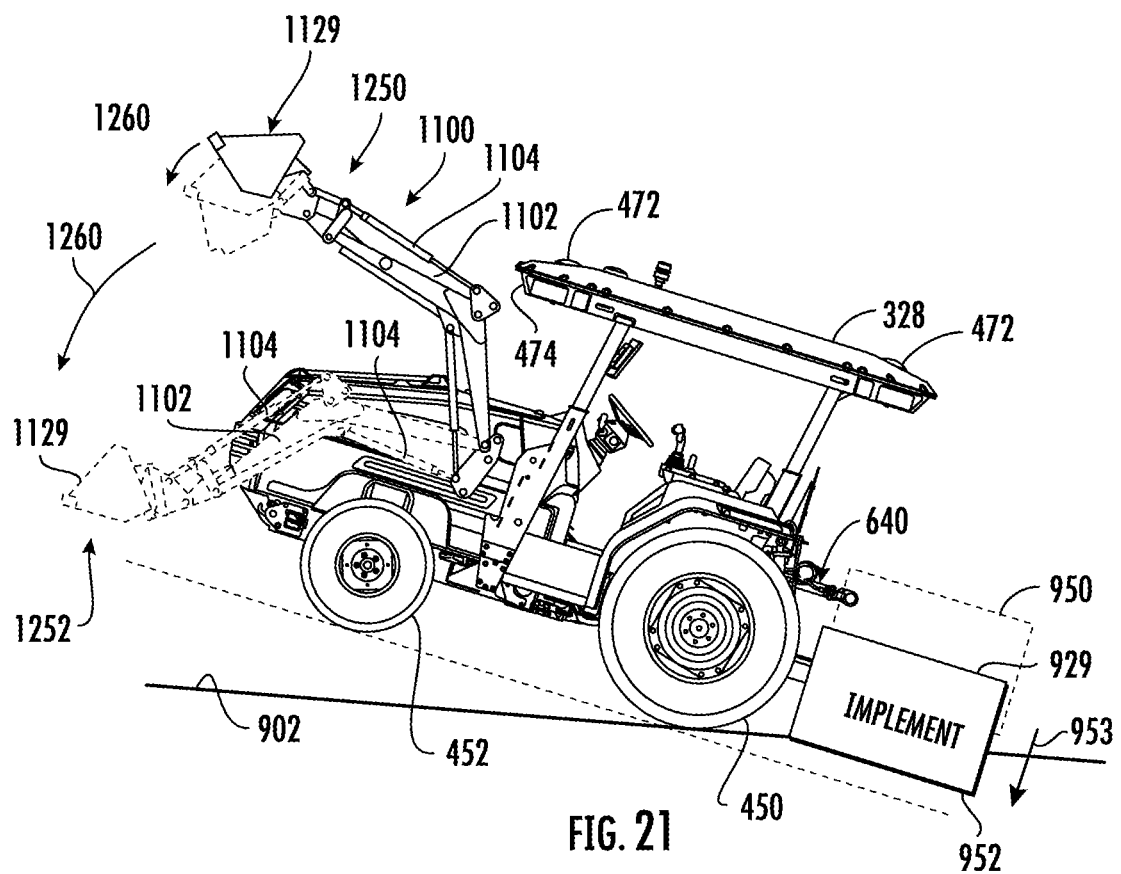
FIG. 21 is a side view of the example vehicle rollover mitigation system of FIG. 7 experiencing and countering a pitch rollover threat.

FIGS. 20 and 21 illustrates tractor 328 equipped with an example lift mechanism 1100 supporting an example implement 1129 in the form of a bucket. Lift mechanism 1100 comprises lift links 1102 and actuators 1104, in the form of hydraulic cylinder-piston assemblies. FIGS. 20 and 21 illustrate examples of how mitigation controller 330 may output control signals adjusting a height or orientation of the implement 1129 to mitigate the risk of a rearward rollover. Similar to the circumstance shown in FIG. 17, FIG. 20 illustrates an example of mitigation controller 330 outputting control signals to automatically respond to a pitch rollover threat. FIG. 20 illustrates an example where vehicle 328 is coupled to a structure 800 via a flexible line 802. In the example illustrated, structure 800 comprises a tree stump, wherein tractor 328 is attempting to pull out the tree stump. In the example illustrated, flexible line 802 may be in the form of a table, rope, chain or the like. As shown by FIG. 20, the forward torque applied to rear wheels 450 in the direction indicated by arrow 804 results in tractor 328 pivoting or pitching about a transverse axis of tractor 328.

Mitigation controller 330 may identify a pitch rollover threat based upon rollover symptom signals received from rollover sensors in the form of IMUs 440, 472 and 476. An ongoing or forthcoming forward or rearward rollover about a lateral axis of the vehicle, a pitch rollover or pitch rollover, may be determined based upon a sensed pitch rate, longitudinal acceleration and vertical acceleration of the vehicle as determined from signals received from the gyros and accelerometers of the IMUs. In some implementations, different data values may be conditioned using a Kalman filter, such as an extended Kalman filter.

In automatic response to a determination that the pitch rollover threat is sufficiently high, exceeding a predetermined threshold, mitigation controller 330 may output mitigation control signals to drive/steering controller 416 which reverse the torque applied to rear wheels 450 such that a torque is applied in the direction indicated by arrow 808. Because tractor 328 relies upon a battery-powered electric motor to supply torque to rear wheels 450, the reversal of torque supplied by the electric motor and applied to wheel 450 may be made in less than 1.5 seconds following the rollover threat determination. This response time may be on the order of 10 times or more faster than response time for a torque reversal for a torque source powered by an internal combustion engine.

As further shown by FIG. 20, mitigation controller 330 may further output mitigation control signals that cause tractor 328 to lower the connection point 812 for flexible line 802. By lowering the connection point 812, mitigation controller 330 reduces the forces causing pitch rollover threat.

Tractor 328 additionally comprises the example front lift mechanism 1100 and the example front implement 1129. To further mitigate any pitch rollover risk, mitigation controller 330 may additionally output control signals causing actuators 1104 to pivot or articulate links 1102 in a manner so as to lower implement 1129 from the raised position 1150 toward or to the lowered position 1152 as indicated by arrow 1160. Such control signals may further cause actuators 1104 to pivot implement 1129 relative to links 1102, as indicated by arrow 1162, in a counterclockwise direction to further lower implement 1129. In circumstances where implement 1129 is approaching contact with the terrain 902, controller 330 may output control signals causing actuators 1104 to once again pivot implement 1129 in an upward direction (opposite to arrow 1162) to facilitate lowering of implement 1129 and lift mechanism 1100 by a greater extent towards the ground. The lower position of implement 1129 (and that of lift mechanism 1100) lowers the center of gravity tractor 328 to mitigate the risk of a pitch rollover.

In some implementations, based upon signals from IMUs 472 and/or camera 474, mitigation controller 330 may determine that the front-end of tractor 328 is currently elevated above terrain 902, with wheels 452 above terrain 902. In response to such a determination, mitigation controller 330 may automatically output control signals causing implement 1129 to be lowered to an even greater extent such that lowermost portions of implement 1129 are lowered below the bottom of tires 452 (or below a plane intersecting the bottom of the rear tires 450 and the front tires 452), without contacting or intersecting terrain 902. This even lower height of implement 1129 (and lift mechanism 1100) may further assist in mitigating any risk of a pitch rollover. Upon the rollover risk being averted and as tractor 328 begins pivoting in a counterclockwise direction such that the front-end of tractor 328 begins returning towards terrain 902 and such that wheels 452 lower towards terrain 902, mitigation controller 330 may output control signals causing actuators 1104 to correspondingly raise implement 1129 to an extent such that implement 1129 does not contact terrain 902 as the front of tractor 328 returns towards the ground.

FIG. 21 illustrates an example of mitigation controller 330 outputting mitigation control signals to respond to a pitch rollover threat for tractor 328. In some circumstances, tractor 328 may be experiencing a pitch rollover threat due to traveling up an incline 900. In some circumstances, tractor 328 may experience a pitch rollover threat to the weight of a carried load or implement 929 at the rear of tractor 328.

In response to determining that a rollover threat exceeds a predetermined threshold, mitigation controller 330 may output mitigation control signals that cause lowering of the implement 929 from the first height 1250 to the second lower height 1252 as indicated by arrow 953. In some implementations, such control signals cause a three-point hitch 640 to lower implement 929. In some implementations, the control signals may cause an actuator, such as actuator 744 (shown in FIG. 13) to lower implement 929. In some implementations, implement 929 may be lowered into physical contact with the underlying terrain 900 (or 902). In some implementations, implement 99 may be lowered such that portions of the implement project into or extend below the surface of the underlying terrain 900 or 902. The lower center of gravity of implement 929 may assist in countering or limiting the pitch rollover.

To further mitigate any pitch rollover risk, mitigation controller 330 may additionally output control signals causing actuators 1104 to pivot or articulate links 1102 in a manner so as to lower implement 1129 from the raised position 1150 toward or to the lowered position 1152 as indicated by arrow 1260. Such control signals may further cause actuators 1104 to pivot implement 1129 relative to links 1102. For example, as indicated by arrow 1262, controller 330 may output control signals causing actuators 1104 to pivot implement 1129 in a counterclockwise direction to further lower implement 1129. In circumstances where implement 1129 is approaching contact with the terrain 902, controller 330 may output control signals causing actuators 1104 to once again pivot implement 1129 in an upward direction (opposite to arrow 1162) to facilitate lowering of implement 1129 and lift mechanism 1100 by a greater extent towards the ground. The lower position of implement 1129 (and that of lift mechanism 1100) lowers the center of gravity tractor 328 to further mitigate the risk of a pitch rollover.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle rollover mitigation system comprising:
   at least one first sensor to output rollover symptom signals indicating a pitch rollover potential of a vehicle having rear wheels during application of a forward torque to the rear wheels; and
   a controller to automatically output rollover mitigation control signals for mitigating potential pitch rollover of the vehicle based upon the rollover symptom signals, wherein the mitigation control signals automatically cause application of a reverse torque to the rear wheels.

2. The vehicle rollover mitigation system of claim 1, wherein the at least one first sensor comprises at least one inertial motion unit carried by the vehicle.

3. The vehicle rollover mitigation system of claim 1, wherein the mitigation control signals further cause the vehicle to lower a rear connection point for a flexible line based upon the rollover symptom signals.

4. The vehicle rollover mitigation system of claim 1, wherein the controller is configured to:
   determine a pitch rollover threat determination based upon the rollover symptom signals; and
   cause initiation of the application of the reverse torque to the rear wheels in less than 1.5 seconds following a determination that the pitch rollover threat determination exceeds a predetermined threshold.

5. The vehicle rollover mitigation system of claim 1, wherein the vehicle comprises a battery-power electric motor to supply the forward torque to the rear wheels and to supply the rearward torque to the rear wheels.

6. A vehicle rollover mitigation system comprising:
   at least one sensor to output rollover symptom signals indicating a rollover potential of a vehicle;
   a controller to output rollover mitigation control signals based upon the rollover symptom signals for mitigating potential rollover of the vehicle, the rollover mitigation control signals altering a state of an implement coupled to the vehicle and extending along a longitudinal axis, wherein the rollover mitigation control signals adjust a roll orientation of the implement about the longitudinal axis.

7. The vehicle rollover mitigation system of claim 6, wherein the vehicle comprises a three-point hitch and wherein the rollover mitigation control signals are to differentially displace lower links of the three-point hitch to adjust the roll orientation of the implement coupled to the three-point hitch.

8. The vehicle rollover mitigation system of claim 6, wherein the vehicle comprises a three-point hitch having lower links and when the rollover mitigation control signals are to move the lower links to different relative heights to rotate the implement carried by the lower links to position a side of the implement towards an upslope of terrain closer to ground.

9. The vehicle rollover mitigation system of claim 6, wherein the implement comprises a frame, wheels coupled to the frame on opposite transverse sides of the frame, and an actuator, wherein the rollover mitigation control signals are to cause the actuator to differently elevate transverse sides of the frame to alter the roll orientation of the implement to position a side of the implement towards an upslope of terrain closer to ground.

10. The vehicle rollover mitigation system of claim 9, wherein the actuator comprises hydraulic cylinders.

11. The vehicle rollover mitigation system of claim 6, wherein the vehicle comprises wheels rotatable about a transverse axis, wherein the longitudinal axis extends perpendicular to the transverse axis when the implement is rearward the vehicle.

12. The vehicle rollover mitigation system of claim 6, wherein the rollover potential of the vehicle indicated by the rollover symptom signals is a roll of the vehicle.

13. A vehicle rollover mitigation system comprising:
   at least one sensor to output rollover symptom signals indicating a rollover potential of a vehicle;
   a controller to output rollover mitigation control signals based upon the rollover symptom signals for mitigating potential rollover of the vehicle, the rollover mitigation control signals altering a state of an implement coupled to the vehicle, wherein the vehicle comprises a three-point hitch and wherein the rollover mitigation control signals are to differentially displace lower links of the three-point hitch to adjust an orientation of the implement coupled to the three-point hitch.

14. The vehicle rollover mitigation system of claim 13, wherein the rollover potential of the vehicle indicated by the rollover symptom signals is a roll of the vehicle.

* * * * *